United States Patent
Fortini et al.

(10) Patent No.: US 9,633,408 B2
(45) Date of Patent: Apr. 25, 2017

(54) COALESCING GRAPHICS OPERATIONS

(71) Applicant: Microsoft Technology Licensing, LLC, Redmond, WA (US)

(72) Inventors: Christian Fortini, Sammamish, WA (US); Rico Mariani, Redmond, WA (US); Anjali S. Parikh, Redmond, WA (US); Matthew P. Kotsenas, Seattle, WA (US); Jason J. Weber, Medina, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 273 days.

(21) Appl. No.: 13/918,825

(22) Filed: Jun. 14, 2013

(65) Prior Publication Data

US 2014/0368515 A1 Dec. 18, 2014

(51) Int. Cl.
*G06F 3/00* (2006.01)
*G09G 5/00* (2006.01)
*G06T 1/20* (2006.01)
*G06T 15/00* (2011.01)

(52) U.S. Cl.
CPC .............. *G06T 1/20* (2013.01); *G06T 15/005* (2013.01)

(58) Field of Classification Search
CPC ................................ G06T 11/60; G06F 9/4443
USPC .......................................... 345/619; 715/762
See application file for complete search history.

(56) References Cited

U.S. PATENT DOCUMENTS

| | | |
|---|---|---|
| 7,228,500 B2 | 6/2007 | Calvert et al. |
| 7,426,735 B2 | 9/2008 | Bliss |
| 8,020,089 B1 | 9/2011 | Brichford et al. |
| 9,430,808 B2 | 8/2016 | Fortini et al. |
| 2003/0063627 A1 | 4/2003 | Toshitani |
| 2005/0278059 A1 | 12/2005 | Osborn et al. |
| 2007/0139430 A1 | 6/2007 | Korn et al. |
| 2009/0204666 A1* | 8/2009 | Sana et al. ............... 709/203 |
| 2009/0300656 A1 | 12/2009 | Bosworth et al. |
| 2010/0141678 A1* | 6/2010 | Abdo et al. ................ 345/619 |
| 2010/0164983 A1* | 7/2010 | Lawrence et al. .......... 345/611 |
| 2010/0251167 A1 | 9/2010 | DeLuca et al. |
| 2010/0262710 A1* | 10/2010 | Khatib ................ G06F 3/048 709/231 |
| 2010/0287553 A1* | 11/2010 | Schmidt et al. ............ 718/101 |
| 2011/0063313 A1 | 3/2011 | Bolz et al. |
| 2011/0298787 A1 | 12/2011 | Feies et al. |
| 2012/0151408 A1 | 6/2012 | Groth et al. |
| 2012/0159363 A1* | 6/2012 | DeBacker et al. .......... 715/766 |

(Continued)

FOREIGN PATENT DOCUMENTS

EP 2584463 4/2013

OTHER PUBLICATIONS

Jones, et al., "Parallelizing the Web Browser", In Proceedings of the First USENIX Conference on Hot Topics in Parallelism, Mar. 30, 2009, pp. 6.

(Continued)

*Primary Examiner* — Gregory J Tryder
*Assistant Examiner* — Yi Yang

(57) ABSTRACT

Techniques for coalescing graphics operations are described. In at least some embodiments, multiple graphics operations can be generated to be applied to a graphical element, such as a graphical user interface (GUI). The graphics operations can be coalesced into a single renderable graphics operation that can be processed and rendered.

20 Claims, 16 Drawing Sheets

(56) References Cited

U.S. PATENT DOCUMENTS

| | | | |
|---|---|---|---|
| 2012/0174121 A1 | 7/2012 | Treat et al. | |
| 2012/0260181 A1 | 10/2012 | Sule et al. | |
| 2013/0021360 A1 | 1/2013 | Gruber | |
| 2013/0097534 A1* | 4/2013 | Lewin et al. | 715/762 |
| 2014/0129966 A1* | 5/2014 | Kolesnikov et al. | 715/765 |
| 2014/0157108 A1* | 6/2014 | Schmidt et al. | 715/234 |
| 2014/0375657 A1 | 12/2014 | Fortini et al. | |

OTHER PUBLICATIONS

"WebCL—Heterogeneous Parallel Computing in HTML5 Web Browsers", Retrieved at: <<http://www.khronos.org/webcl/>>, Aug. 9, 2011, pp. 2.

McMullen, et al., "Graphics on Web Platforms for Complex Systems Modelling and Simulation", In Proceedings of the International Conference on Computer Graphics and Virtual Reality, Jul. 16, 2012, pp. 9.

"Independent Composition: Rendering and Compositing in Internet Explorer 10", Retrieved at: <<http://msdn.microsoft.com/en-us/library/ie/jj680148(v=vs.85).aspx>>, Jan. 27, 2013, pp. 14.

Jones-Bey, Bem, "Getting Started With the WebKit Layout Code", Retrieved at: <<http://blogs.adobe.com/webplatform/2013/01/21/getting-started-with-the-webkit-layout-code/>>, Jan. 21, 2013, pp. 5.

Mai, et al., "A Case for Parallelizing Web Pages", In Proceedings of the 4th USENIX Workshop on Hot Topics in Parallelism, Jun. 7, 2012, pp. 6.

Rousset, David, "Introduction to HTML5 Web Workers: The JavaScript Multi-Threading Approach", Retrieved at: <<http://www.codeproject.com/Articles/271571/Introduction-to-HTML5-Web-Workers-The-JavaScript-M>>, Apr. 3, 2012, pp. 12.

"International Search Report & Written Opinion for PCT Application No. PCT/US2013/060756", Mailed Date: Mar. 18, 2014, Filed Date: Sep. 20, 2013, 11 Pages.

Lee, Young Han, "Parallelizing Canvas Rendering", Published on: Sep. 23, 2011, Available at: http://www.dorothybrowser.com/parallelizing-canvas-rendering/.

Garsiel, et al., "How Browsers Work: Behind the Scenes of Modern Web Browsers", Published on: Aug. 5, 2011, Available at: http://www.html5rocks.com/en/tutorials/internals/howbrowserswork/#The_rendering_engine.

"Direct Manipulation", Retrieved from <http://msdn.microsoft.com/en-us/library/windows/desktop/hh446969(v=vs.85).aspx> on Apr. 12, 2013, Oct. 27, 2012, 6 pages.

"International Search Report and Written Opinion", Application No. PCT/US2013/061060, Feb. 27, 2014, 11 pages.

"Mozilla/Servo—Design", Retrieved from <https://github.com/mozilla/servo/wiki/Design> on Apr. 12, 2013, Dec. 21, 2012, 5 Pages.

"Non-Final Office Action", U.S. Appl. No. 13/921,727, Oct. 1, 2015, 16 pages.

Patil, "WebSphere Notes", Retrieved from <http://wpcertification.blogspot.in/2008/10/parallel-rendering-of-portlet.html> on Apr. 12, 2013, Oct. 2008, 3 pages.

"Notice of Allowance", U.S. Appl. No. 13/921,727, May 6, 2016, 5 pages.

"Corrected Notice of Allowance", U.S. Appl. No. 13/921,727, Aug. 2, 2016, 2 pages.

\* cited by examiner

COALESCING GRAPHICS OPERATIONS

BACKGROUND

Today's computing devices have an ever-increasing amount of processing power. For example, a typical device has a central processing unit (CPU) with multiple processing cores that can each perform data processing. Further, the number of cores available on individual processors continues to increase. With the prevalence of multi-core processors comes the ability to perform multiple processing tasks on a CPU in parallel. For example, multiple processing threads that each handles a particular processing task can execute at the same time on respective cores of a processor. Thus, the speed with which multiple tasks can be completed is increased over previous single-core processors.

While available processing power has increased, many computing processes still utilize a serial processing approach for scheduling and/or managing processing tasks. For example, some applications are not configured to parallelize certain processing tasks, and thus do not leverage the parallel processing capabilities of multi-core processors. By not parallelizing processing tasks, these processes do not receive the performance benefits that result from parallel processing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for coalescing graphics operations are described. In at least some embodiments, multiple graphics operations can be generated to be applied to a graphical element, such as a graphical user interface (GUI). The graphics operations can be coalesced into a single renderable graphics operation that can be processed and rendered.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
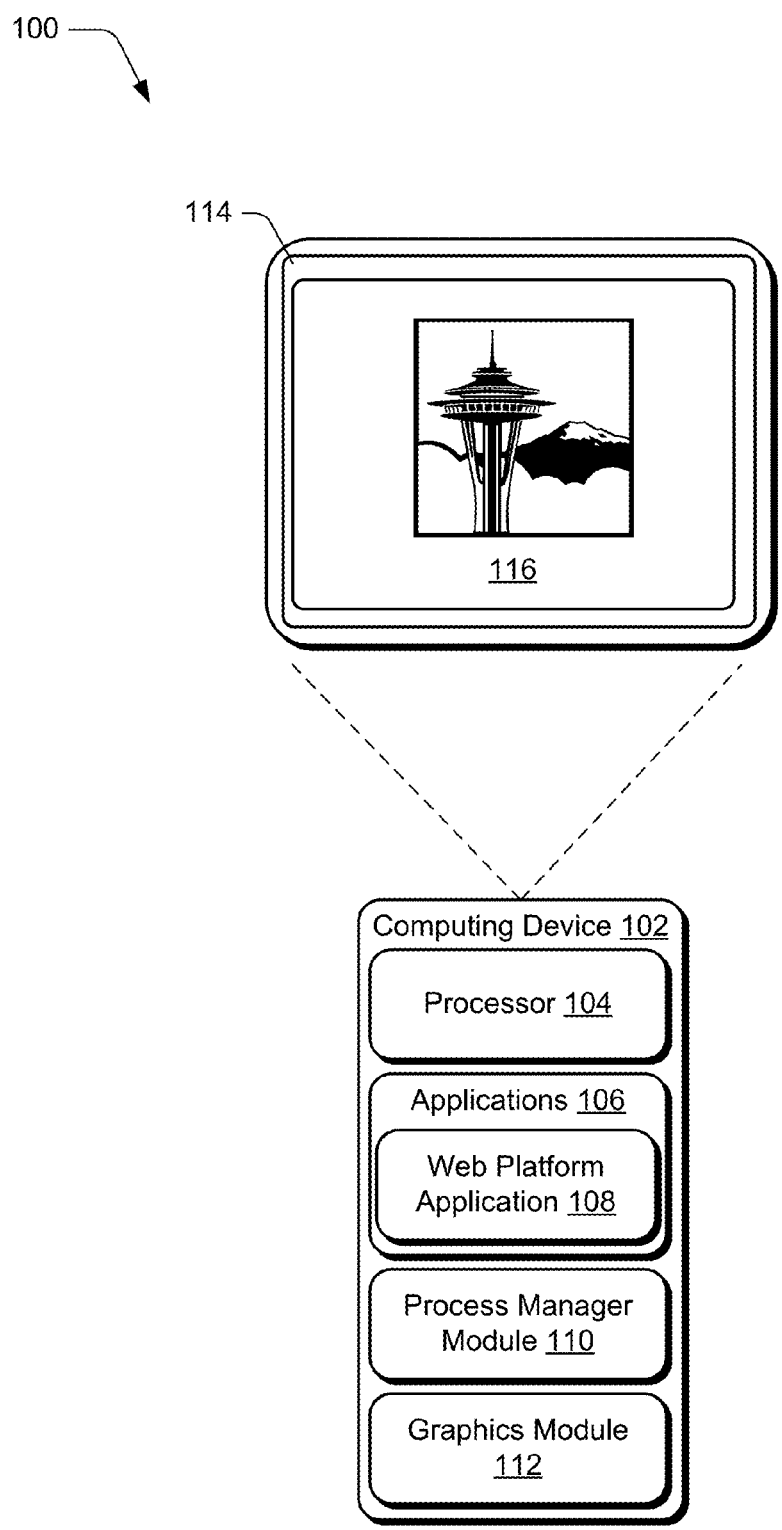
FIG. 1 is an illustration of an environment in an example implementation that is operable to employ techniques discussed herein.

Techniques for coalescing graphics operations are described. In at least some embodiments, multiple graphics operations can be generated to be applied to a graphical element, such as a graphical user interface (GUI). The graphics operations can be coalesced into a single renderable graphics operation that can be processed and rendered.

For instance, consider a scenario where a web browser displays a webpage. Techniques discussed herein can utilize a first thread to perform various processing for the webpage, such as webpage JavaScript execution, formatting tasks, layout tasks, input processing tasks, and so forth. A second independently-running thread can be employed to perform rendering tasks, such as displaying a current view of the webpage to a screen.

Based on events that affect visual attributes of the webpage, the first thread can perform graphics operations that change visual state information for the webpage. Examples of such events include user input to the webpage, animation of graphical elements, events generated by other processes, and so forth. The visual state information, for example, can include changes to a visual state of the webpage, such as movement of graphical elements of the webpage, resizing and/or recoloring of graphical elements, panning and/or scrolling of the webpage, and so forth.

Further to the example scenario, the second thread may not be immediately available to process the graphics operations and render to the webpage based on the operations. For instance, the second thread may be busy rendering based on previous graphics operations generated by the first thread.

Accordingly, the graphics operations may be queued until the second thread becomes available. The graphics operations, for instance, may be queued as "synchronization points" that each corresponds to a discrete change in the visual state of the webpage. When the second thread becomes available to process the graphics operations, the graphics operations can be coalesced into a single graphics operation that can be applied to the webpage. Either thread, for example, can combine the graphics operations into a combined graphics operation that reflects state changes from each of the individual operations. Thus, the second thread need not process each graphics operation separately, but can process and render the combined graphics operation to arrive at the same visual state of the webpage that would occur if each graphics operation were individually processed.

In the following discussion, an example environment is first described that is operable to employ techniques described herein. Next, a section entitled "Synchronization Points for Propagating State Information" describes some example implementation scenarios and procedures that utilize synchronization points in accordance with one or more embodiments. Following this, a section entitled "Coalescing Graphics Operations" describes some example implementation scenarios and procedures for coalescing graphics operations in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

FIG. 1 is an illustration of an environment 100 in an example implementation that is operable to employ techniques for coalescing graphics operations described herein. The illustrated environment 100 includes a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device (e.g., a tablet), and so forth as further described in relation to FIG. 16.

Computing device 102 includes a processor 104, which is representative of functionality to perform various types of data processing for the computing device 102. For example, the processor 104 can represent a central processing unit (CPU) of the computing device 102. The processor 104 includes multiple processor cores that are capable of individually performing processing tasks. Thus, the processor 104 is configured to perform parallel processing, such as executing multiple processing threads simultaneously. Further examples of implementations of the processor 104 are discussed below with reference to FIG. 16.

The computing device 102 further includes applications 106, which are representative of functionalities to perform various tasks via the computing device 102. Examples of the applications 106 include a word processor application, an email application, a content editing application, a gaming application, and so on.

The applications 106 include a web platform application 108, which is representative of an application that operates in connection with web content. The web platform application 108, for example, can include and make use of many different types of technologies such as, by way of example and not limitation, uniform resource locators (URLs), Hypertext Transfer Protocol (HTTP), Representational State Transfer (REST), HyperText Markup Language (HTML), Cascading Style Sheets (CSS), JavaScript, Document Object Model (DOM), as well as other technologies. The web platform application 108 can also work with a variety of data formats such as Extensible Application Markup Language (XAML), Extensible Markup Language (XML), JavaScript Object Notation (JSON), and the like. Examples of the web platform application 108 include a web browser, a web application (e.g., "web app"), and so on.

Further illustrated is a process manager module 110, which is representative of functionality to manage various aspects of processing tasks for the computing device 102. A graphics module 112 is also included, which is representative of functionality to perform various graphics-related tasks for the computing device 102. For instance, the graphics module 112 can perform graphics processing, rendering tasks, and so forth. The graphics module 112, for example, can represent a rendering engine for the applications 106, such as the web platform application 108. In at least some embodiments, the process manager module 110 and/or the graphics module 112 can be leveraged to implement techniques for coalescing graphics operations discussed herein.

While the process manager module 110 and the graphics module 112 are illustrated as separate from the applications 106, this is not intended to be limiting. The process manager module 110 and/or the graphics module 112, for example, can be implemented as a part and/or extension of the applications 106 such that their respective functionalities can be leveraged by the applications 106. Alternatively or additionally, the process manager module 110 and/or the graphics module 112 can be implemented as part of an operating system of the computing device 102. Further operational aspects of the process manager module 110 and the graphics module 112 are discussed below.

The computing device 102 includes a display device 114, which is configured to output graphics for the computing device 102. Displayed on the display device 114 is a graphical user interface (GUI) 116, which is representative of a GUI associated with one of the applications 106. The GUI 116, for example, can include web content presented via the web platform application 108. For instance, the GUI 116 can represent a web document, such as a webpage. According to one or more embodiments, techniques for coalescing graphics operations discussed herein can be employed to perform various processing tasks related to the GUI 116, such as layout processing, input processing, graphics rendering, and so forth.

Having described an example environment in which the techniques described herein may operate, the following sections now discuss example techniques for utilizing synchronization points for propagating state information, and then examples techniques for coalescing graphics operations in accordance with one or more embodiments.

Synchronization Points for Propagating State Information

The following section describes example implementation scenarios and procedures further to utilizing synchronization points for propagating state information in accordance with one or more embodiments.

Example Implementation Scenarios

The following discussion describes some example implementation scenarios for techniques for utilizing synchronization points for propagating state information described herein. The example implementation scenarios may be implemented in the environment 100 of FIG. 1, the system 1600 of FIG. 16, and/or any other suitable environment. The scenarios, for example, can represent functionality of the process manager module 110 and/or the graphics module 112. For instance, the processing threads discussed in the different scenarios can be generated and/or maintained by the process manager module 110 and/or the graphics module 112.

Figure 2:
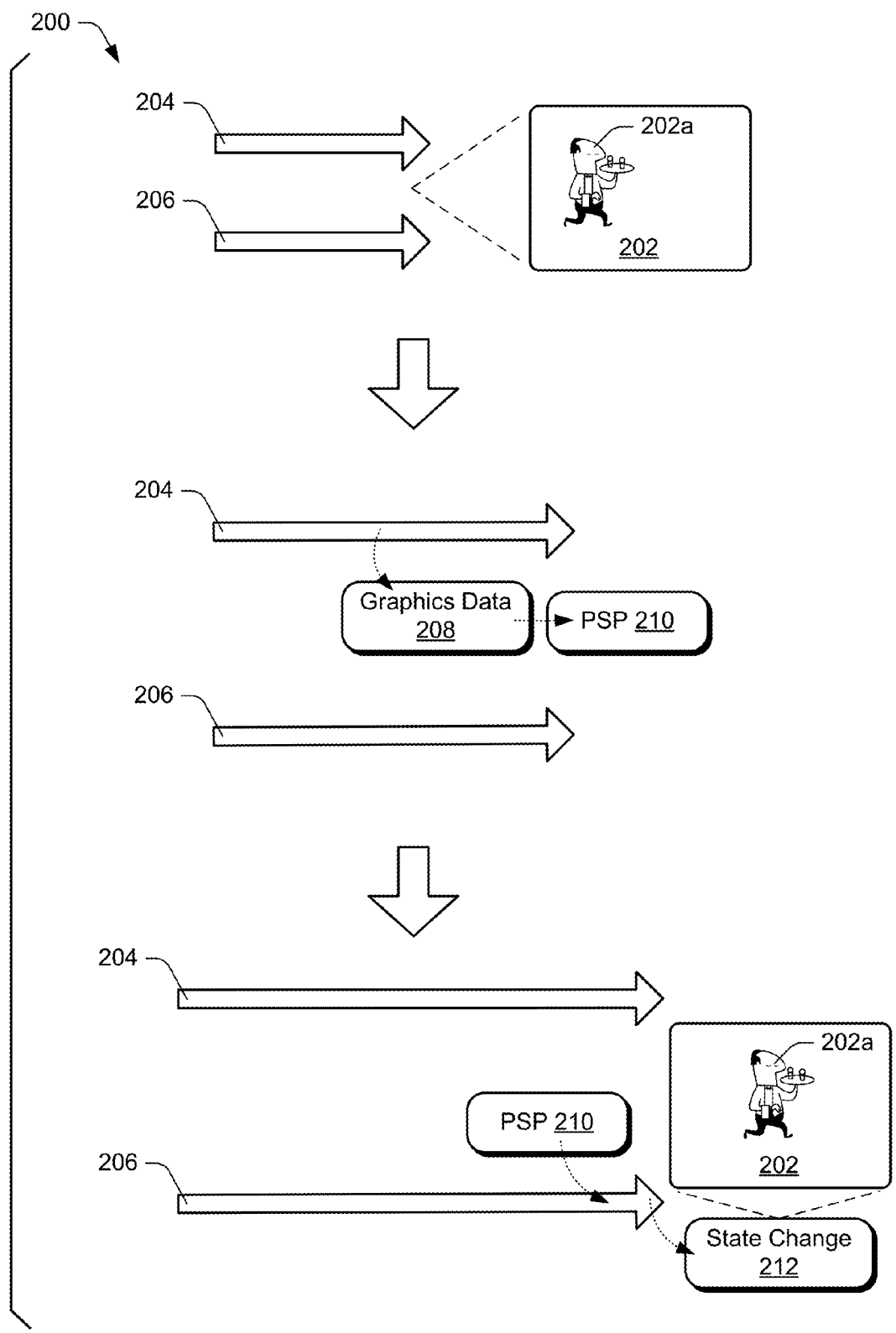
FIG. 2 illustrates an example implementation scenario in accordance with one or more embodiments.

FIG. 2 illustrates an example implementation scenario 200 in accordance with one or more embodiments. The scenario 200 includes a GUI 202, which is representative of various graphical elements that can be displayed. The GUI 202, for example, can represent an implementation of the GUI 116 discussed above with reference to the environment 100. The GUI 202 includes a visual element 202a.

The scenario 200 further includes a primary thread 204 and a render thread 206, which are representative of threads that are employed to perform various processing tasks as part of generating, managing, and rendering the GUI 202.

Generally, the primary thread 204 represents a processing thread that performs various types of management tasks for the GUI 202. Examples of management tasks include generating the GUI 202, such as for one of the applications 106. Other examples of management tasks include executing script (e.g., JScript) for the GUI 202, GUI formatting tasks, GUI layout tasks, DOM manipulations, and so forth. The render thread 206 represents a processing thread that performs rendering operations, such as painting pixels of the GUI 202 to a display. For example, changes to visual aspects of the GUI 202 generated by the primary thread 204 can be rendered for display by the render thread 206. According to various embodiments, the primary thread 204 can pass various graphics information to the render thread 206 for rendering and display.

Proceeding to the center portion of the scenario 200, a change to a visual aspect of the GUI 202 causes the primary thread 204 to generate graphics data 208. The graphics data 208, for example, can describe a change to a visual aspect of the GUI 202. Examples of such changes include color changes, visual element resizing, animation of a visual element, repositioning of a visual element, and so forth. The change, for instance, can occur in various ways, including in response to user interaction with the GUI 202 via various types of user input, time based notifications, or changes from executing website code.

In response to generating the graphics data 208, a paintable synchronization point (PSP) 210 is generated. Generally, the PSP 210 represents a set of information that can be used by the render thread 206 to render portions of the GUI 202. The PSP 210, for example, can include and/or be based on the graphics data 208. Alternatively or additionally, the PSP 210 can include information sufficient to enable the render thread 206 to retrieve the graphics data 208, such as a memory address at which the graphics data 208 resides.

In at least some embodiments, the PSP 210 includes various types of state information for the GUI 202. For example, the PSP 210 can include state change information, such as an indication of visual attributes of the GUI 202 that have changed since a previous PSP was generated and/or a previous render operation was performed by the render thread 206. Thus, according to one or more embodiments, the PSP 210 may not include data for a complete rendering of the GUI 202, but may simply indicate state change information sufficient to update the GUI 202 to a new visual state. This is not intended to be limiting, however, and in at least some embodiments a PSP can represent a complete rendering of a GUI.

After emitting the PSP 210, the primary thread 204 may continue processing management tasks for the GUI 202, e.g., without waiting for the render thread 206 to retrieve and/or process the PSP 210.

Proceeding to the lower portion of the scenario 200, the render thread 206 processes the PSP 210 to generate a state change 212. Generally, the state change 212 is a re-render of a portion of the GUI 202 based on state information from the PSP 210. Thus, the state change 212 is applied to the GUI 202 (e.g., as part of a render and/or draw operation) to synchronize a visual state of the GUI 202 with the visual state indicated by the PSP 210. In this particular example, application of the state change 212 causes a repositioning of the visual element 202a, e.g., a translational movement of the visual element 202a within the GUI 202.

Thus, the scenario 200 illustrates that changes to a visual state of a graphical element generated by a first thread can be encapsulated via a PSP that can be consumed by another thread to apply the changes. Further, the first thread may continue performing other processing tasks after the PSP has been emitted, e.g., without waiting for the PSP to be processed. Thus, in at least some embodiments, a PSP provides a mechanism by which state information can be transferred between independent threads.

In at least some embodiments, techniques discussed herein enable multiple PSPs to be generated and processed asynchronously. For instance, consider the following example scenario.

Figure 3:
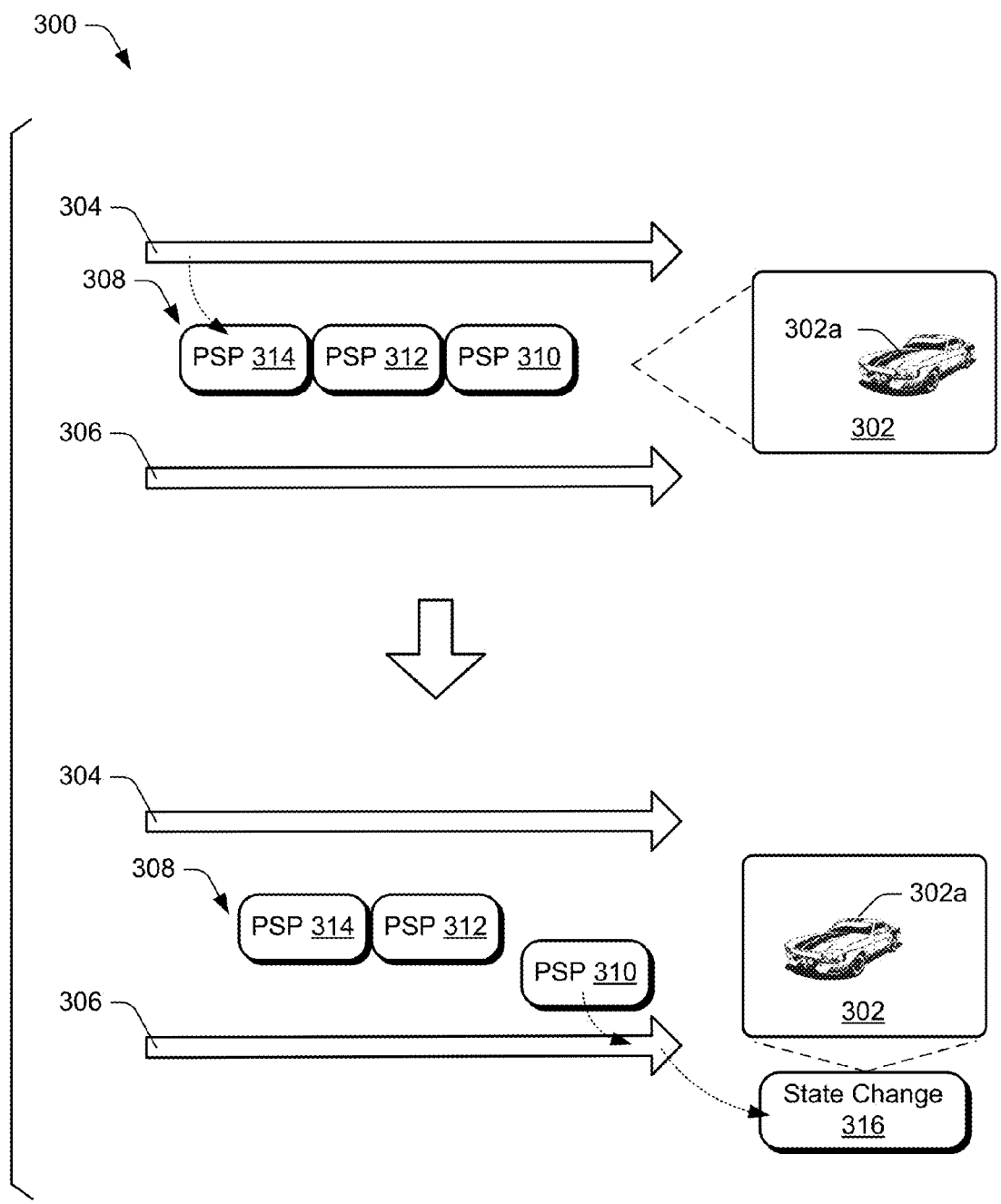
FIG. 3 illustrates an example implementation scenario in accordance with one or more embodiments.

FIG. 3 illustrates an example implementation scenario 300 in accordance with one or more embodiments. The scenario 300 includes a GUI 302, which is representative of various graphical elements that can be displayed. The GUI 302, for example, can represent an implementation of the GUI 116 discussed above with reference to the environment 100. The GUI 302 includes a visual element 302a.

The scenario 300 further includes a primary thread 304 and a render thread 306 for the GUI 302. Example details concerning a primary thread and a render thread are discussed above. Based on visual state changes to the GUI 302, a PSP queue 308 is generated that includes multiple PSPs. For instance, the PSP queue 308 includes a PSP 310, a PSP 312, and a PSP 314 that are generated by the primary thread 304. The PSPs can be generated based on various events, such as user interaction with the GUI 302, events generated by processes, and so forth. As referenced above, the PSPs 310, 312, 314 correspond to changes in a visual state of the GUI 302. For instance, the PSPs 310, 312, 314 can correspond to movement of the visual element 302a in the GUI 302.

In at least some embodiments, PSPs can accumulate in the PSP queue 308 when the PSPs are generated by the primary thread 304 faster than the render thread 306 can process and apply the PSPs. For instance, the render thread 306 may be performing a complex and time-consuming render operation based on a recently consumed PSP such that the primary thread 304 generates additional PSPs before the render thread 306 completes the complex render operation. Thus, PSPs can be queued in a temporally sequential order, with an older PSP placed before a newer one in the queue.

Proceeding to the lower portion of the scenario 300, the render thread 306 retrieves the PSP 310 from the PSP queue 308. The render thread 306 processes the PSP 310 to generate a state change 316. The state change 316 corresponds to a change in a visual state of the GUI 302. For example, the state change 316 represents a difference between a previous visual state and a current visual state of the GUI 302. Accordingly, in at least some embodiments, the PSP 310 and thus the state change 316 do not represent a complete re-rendering of the GUI 302, but include data that can be applied to update the visual state of a portion of the GUI 302.

The render thread 306 applies the state change 316 to the GUI 302, such as by re-rendering a portion of the GUI. For instance, the render thread 306 can change a visual aspect of the visual element 302a, such as recoloring the visual element, resizing the visual element, and so forth, based on data from the state change 316 generated from the PSP 310. Alternatively or additionally, applying the state change 316 can involve movement of the visual element 302a, such as translation, rotation, and so forth.

In response to the render thread 306 retrieving and processing the PSP 310, the PSPs 312, 314 move up in the PSP queue 308. Thus, after the render thread 306 is finished processing and applying the PSP 310, the render thread 306 can retrieve and process the PSP 312. In at least some embodiments, PSPs are consumed by the render thread 306 from the PSP queue 308 in an order in which they were generated by the primary thread 304 and placed in the queue. Processing of PSPs from the PSP queue 308 can continue until no further PSPs remain to be retrieved in the PSP queue 308, and/or the GUI 302 is closed.

Thus, the primary thread 304 can generate PSPs that represent multiple visual state changes to the GUI 302, and can place them in the PSP queue 308 for subsequent processing by the render thread 306. This enables the primary thread 304 to be available to perform other processing tasks without waiting for the render thread 306 to consume PSPs from the PSP queue 308. Accordingly, the primary thread 304 and the render thread 306 can run independently, with interaction between the threads occurring via PSPs.

In at least some embodiments, techniques discussed herein enable user input to be efficiently processed via a render thread. For instance, consider the following example scenario.

Figure 4:
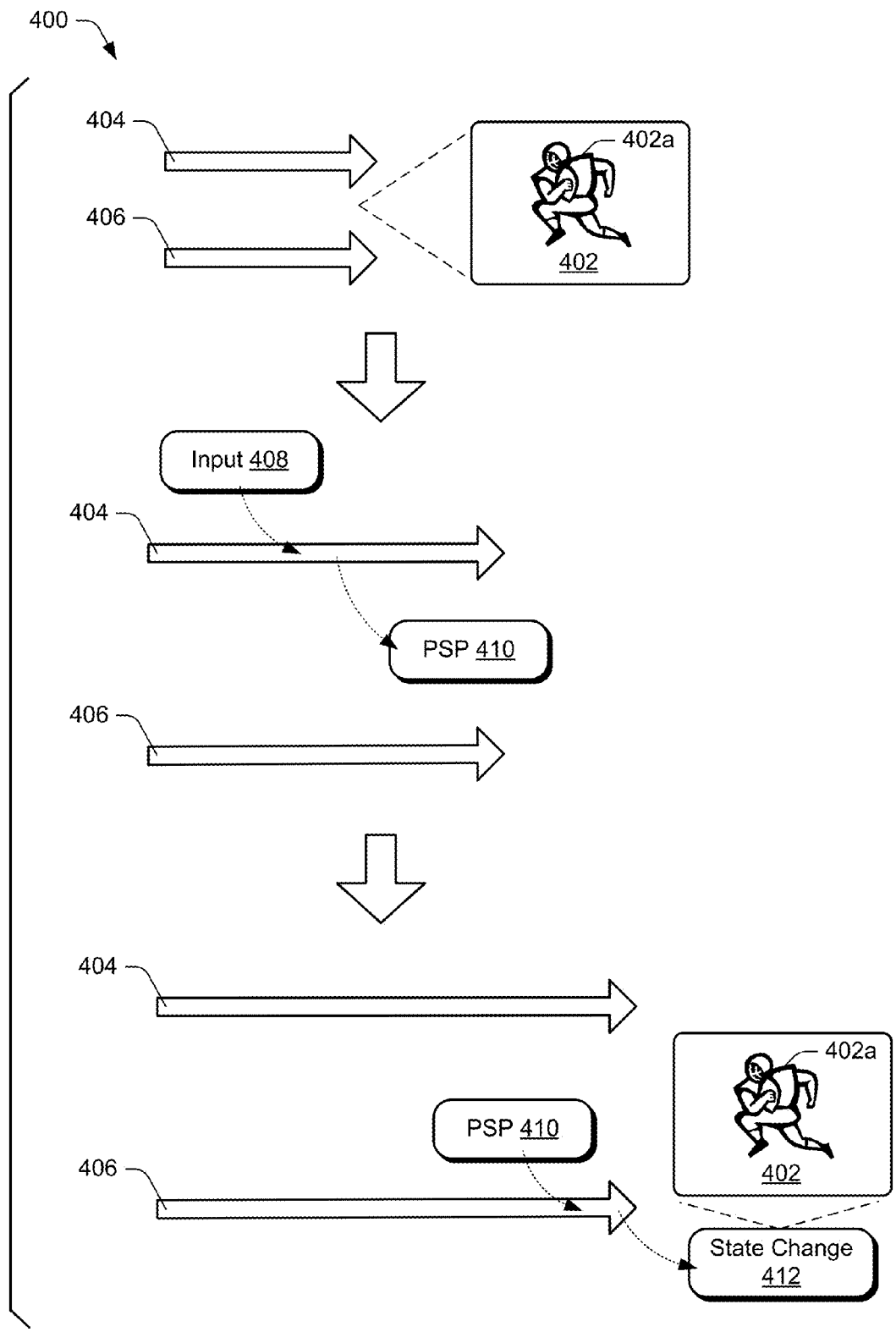
FIG. 4 illustrates an example implementation scenario in accordance with one or more embodiments.

FIG. 4 illustrates an example implementation scenario 400 in accordance with one or more embodiments. The scenario 400 includes a GUI 402, which is representative of various graphical elements that can be displayed. The GUI 402, for example, can represent an implementation of the GUI 116 discussed above with reference to the environment 100. The GUI 402 includes a visual element 402a.

Further illustrated are a primary thread 404 and a render thread 406 for the GUI 402. Details concerning primary threads and render threads are discussed above.

Proceeding to the center portion of the scenario 400, a user provides input 408 to the GUI 402. Examples of the input 408 include touch input, mouse input, keyboard input, voice input, and so forth. In at least some embodiments, the input 408 represents input data received from an input functionality, such as an input device driver.

In response to receiving the input 408, the primary thread 404 processes the input 408 to generate a PSP 410. The PSP 410 represents changes to the GUI 402 based on the input 408. The PSP 410, for example, can indicate various manipulations of the GUI 402. For instance, the PSP 410 can indicate that the GUI 402 is to be scrolled in a display area, a zoom-in or a zoom-out on a portion of the GUI 402, a change to the visual element 402a, and so forth.

Continuing to the lower portion of the scenario 400, the render thread 406 retrieves and processes the PSP 410 to generate a state change 412 for the GUI 402. The state change 412 indicates a re-render of the GUI 402 based on the PSP 410, e.g., based on the input 408. Thus, the render thread 406 renders the GUI 402 based on the input 408. As referenced above, this can include scrolling the GUI 402, zooming on a portion of the GUI 402, panning the GUI 402, and/or other manipulations of portions of the GUI 402.

Thus, once the render thread 406 has obtained data describing a user input (e.g., from a PSP and/or otherwise), the render thread 406 can apply the input to the GUI 402 independent of interaction with the primary thread 404. This enables the primary thread 404 to perform other processing while the input is being applied by the render thread 406, and enables the render thread 406 to actively render the GUI 402 based on the input 408 even if the primary thread 404 is busy with another task.

According to various embodiments, data that describes a visual region of a display (e.g., a GUI) can be represented as a tree structure, or "display tree." Generally, a display tree is a data structure that represents various visual elements of a region of a display. A display tree, for instance, includes different nodes that correspond to respective visual elements of a GUI. As described below, interactions between threads can be characterized via manipulations and versions of a display tree. For instance, consider the following example scenarios.

Figure 5:
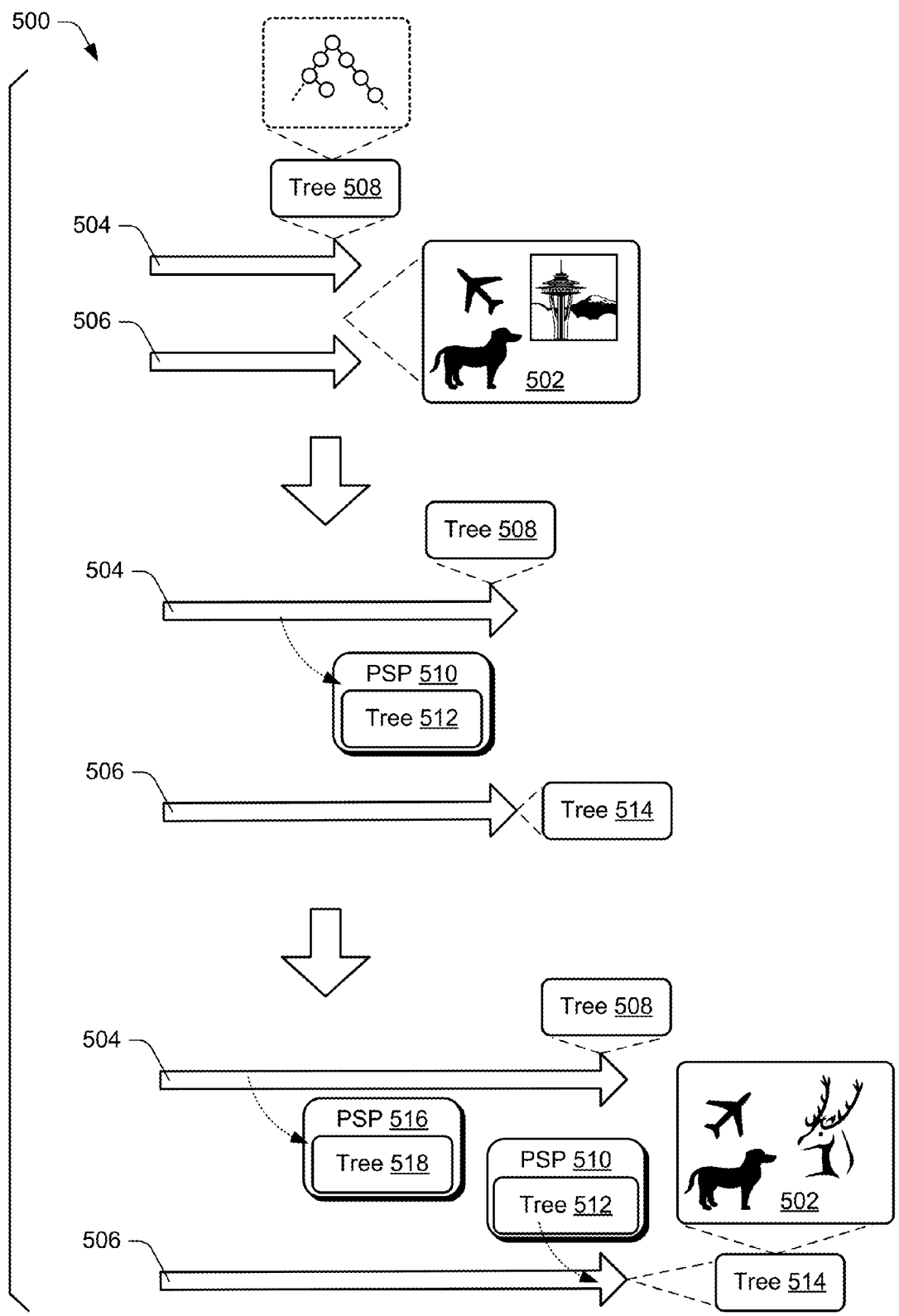
FIG. 5 illustrates an example implementation scenario in accordance with one or more embodiments.

FIG. 5 illustrates an example implementation scenario 500 in accordance with one or more embodiments. The scenario 500 includes a GUI 502, which is representative of various graphical elements that can be displayed. The GUI 502, for example, can represent an implementation of the GUI 116 discussed above with reference to the environment 100. The GUI 502 includes various visual elements, such as windows, graphics, text, images, Graphics Processing Unit (GPU) primitives, and so forth.

The scenario 500 further includes a primary thread 504 and a render thread 506 for the GUI 502. Example details concerning primary threads and render threads are discussed above. The primary thread 504 is associated with a display tree 508, which is a data representation of the GUI 502. The display tree 508, for example, includes nodes that represent various visual elements of the GUI 502. For instance, the display tree 508 includes a parent node that represents the primary window of the GUI 502, as well as multiple child nodes that each represents a respective visual element of the GUI 502.

According to one or more embodiments, the display tree 508 is utilized by the primary thread 504 to perform various processing for the GUI 502. For instance, as various events occur that indicate modifications to visual elements of the GUI 502, the primary thread 504 modifies the display tree 508 accordingly. Thus, the display tree 508 is "owned" by the primary thread 504, and is updateable by the primary thread 504 to reflect various changes that are to be propagated to the GUI 502.

Proceeding to the center portion of the scenario 500, a PSP 510 is generated by the primary thread 504 according to various techniques discussed herein. The PSP 510 can be emitted by the primary thread 504, for example, in response to various events that change visual aspects of the GUI 502. The PSP 510 is associated with a display tree 512.

According to one or more embodiments, the display tree 512 represents a snapshot (e.g., copy) of the display tree 508 captured at a particular moment. For example, the primary thread 504 can modify one or more nodes of the display tree 508 in response to various events. The primary thread 504 can then generate a copy of the display tree 508 as the display tree 512. The primary thread 504 emits the PSP 510 that includes and/or is linked to the display tree 512. Thus, the display tree 512 corresponds to a state of the display tree 508 at a particular instance in time.

After the primary thread 504 emits PSP 510 with the display tree 512, the primary thread 504 can proceed with performing other tasks. For instance, the primary thread can make further modifications to the display tree 508 without affecting the display tree 512.

The scenario 500 further includes a display tree 514 maintained by the render thread 506. Generally, the display tree 514 is utilized by the render thread 506 for rendering visual aspects of the GUI 502. For instance, the render thread 506 reads from the display tree 514 to draw to the GUI 502. According to one or more embodiments, the display tree 514 was generated and/or modified based on a display tree from a previous PSP, e.g., a PSP received prior to the PSP 510. Thus, the display tree 514 is "owned" by the render thread 506. For example, in at least some embodiments the display tree 514 cannot be directly accessed or modified by the primary thread 504.

Proceeding to the lower portion of the scenario 500, the render thread 506 retrieves the PSP 510 and modifies the display tree 514 based on the display tree 512 associated with the PSP 510. The display tree 512, for instance, can indicate changes to one or more nodes of the display tree 514. Thus, the changes can be propagated from the display tree 512 to the display tree 514. Once the state of the display tree 514 is synchronized with the state of the display tree 512, the render thread 506 can proceed with rendering the GUI 502 based on the updated display tree 514.

Thus, visual processing applied by the primary thread 504 to the display tree 508 is propagated via the display tree 512 to the render thread 506, which then applies the visual processing to its own display tree 514.

Further illustrated in the lower portion of the scenario 500 is that the primary thread 504 emits a PSP 516 which includes a display tree 518. As with the display tree 512, the display tree 518 is a copy of the display tree 508 generated by the primary thread 504. The display tree 518, for example, includes changes to the state of the display tree 508 that have occurred subsequent to the display tree 512 having been generated.

When the render thread 506 is finished drawing to the GUI 502 from the current state of the display tree 514, the render thread 506 can retrieve the PSP 516 and can synchronize the display tree 514 with the display tree 518. The render thread 506 can then proceed with rendering the GUI 502 based on the updated display tree 514.

Thus, the scenario 500 illustrates that various states of a display tree can be maintained for a display region. For instance, with reference to the GUI 502, at least three states of a display tree for the GUI 502 can be maintained. The primary thread 504 maintains the display tree 508 to which it applies various changes to the visual state of the GUI 502. To enable changes to the visual state of the GUI 502 to be propagated to the render thread 506 and displayed, the state of the display tree 508 can be captured via an intermediate display tree that can be persisted for consumption by the render thread 506. For instance, the display trees 512, 518 represent snapshots of the display tree 508 captured at different states of the display tree 508. Further, the render thread 506 maintains the display tree 514 which it synchronizes to the intermediate display trees and reads from for rendering to the GUI 502.

In at least some embodiments, PSPs can be employed to propagate changes to a display tree without requiring entire copies of a display tree to be generated. For instance, consider the following example scenario.

Figure 6:
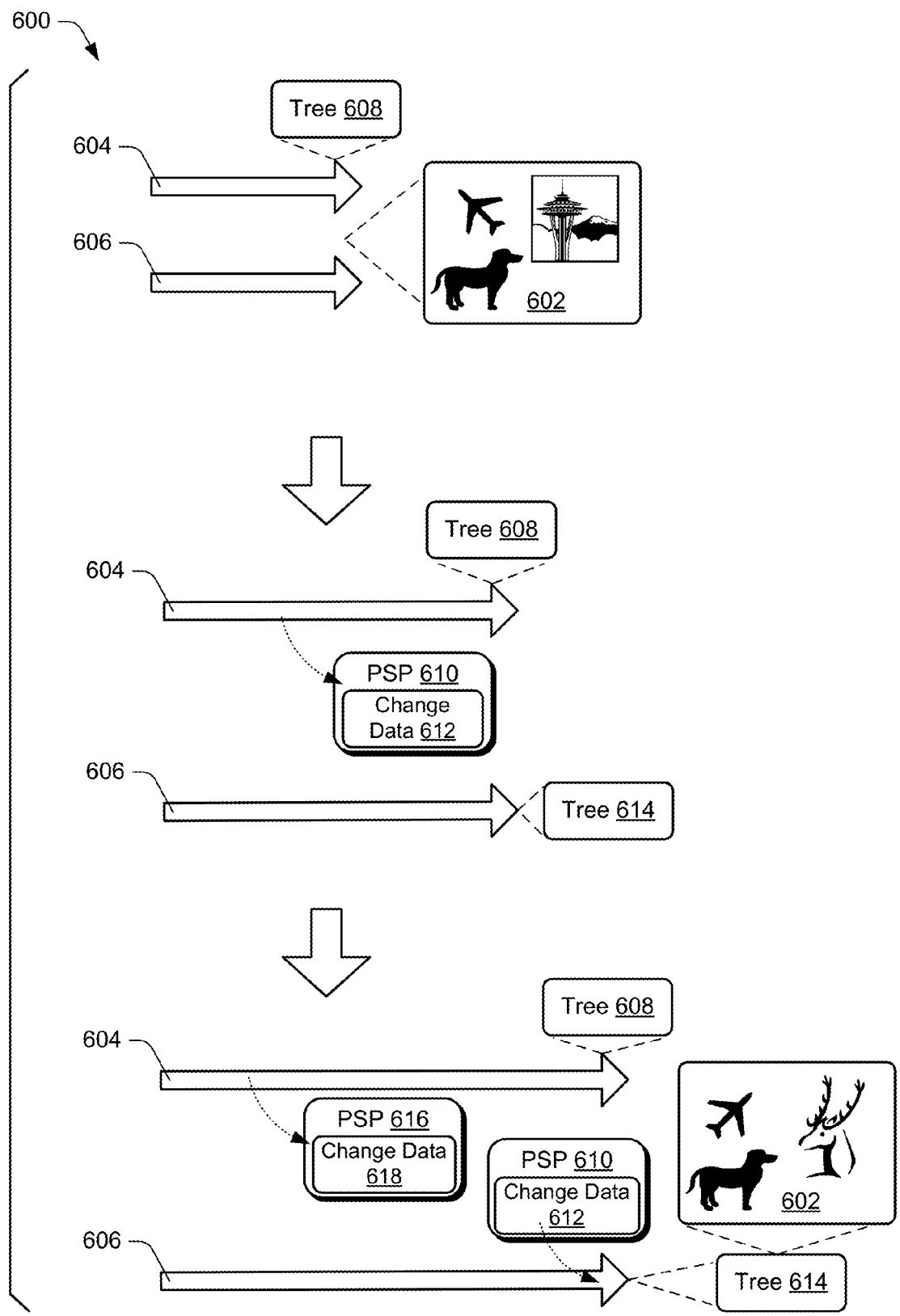
FIG. 6 illustrates an example implementation scenario in accordance with one or more embodiments.

FIG. 6 illustrates an example implementation scenario 600 in accordance with one or more embodiments. The scenario 600 includes a GUI 602, which is representative of various graphical elements that can be displayed. The GUI 602, for example, can represent an implementation of the GUI 116 discussed above with reference to the environment 100. The GUI 602 includes various visual elements, such as windows, graphics, text, images, and so forth.

The scenario 600 further includes a primary thread 604 and a render thread 606 for the GUI 602. Example details concerning primary threads and render threads are discussed above. The primary thread 604 is associated with a display tree 608, which is a data representation of the GUI 602.

Proceeding to the center portion of the scenario 600, a PSP 610 is generated by the primary thread 604 according to various techniques discussed herein. The PSP 610 can be emitted by the primary thread 604, for example, in response to various events that change visual aspects of the GUI 602.

The PSP 610 includes change data 612, which represents changes to the display tree 608 that have occurred. For example, the primary thread 604 can modify one or more nodes of the display tree 608 in response to various events. Other types of changes may also be made, such as adding nodes, deleting nodes, rearranging nodes, and so forth. The primary thread 604 can then generate the change data 612, which specifies the changes that are made to the display tree 608. The primary thread 604 emits the PSP 610 that includes and/or is linked to the change data 612. According to various embodiments, the change data 612 corresponds to changes to the display tree 608 that have occurred since a previous PSP was emitted. Thus, the PSP 612 does not include an entire copy of the display tree 608.

After the primary thread 604 emits the PSP 610 with the change data 612, the primary thread 604 can proceed with performing other tasks. For instance, the primary thread can make further modifications to the display tree 608 without affecting the change data 612.

The scenario 600 further includes a display tree 614 maintained by the render thread 606. Generally, the display tree 614 is utilized by the render thread 606 for rendering visual aspects of the GUI 602. The display tree 614, for instance, corresponds to a version of the display tree 608 generated based on a previous PSP.

Proceeding to the lower portion of the scenario 600, the render thread 606 retrieves the PSP 610 and modifies the display tree 614 based on the change data 612. Thus, the changes indicated in the change data 612 can be applied to the display tree 614. The render thread 606 can then proceed with rendering the GUI 602 based on the updated display tree 614.

According to various embodiments, the PSP 610 persists until the render thread 606 is finished reading data from and/or otherwise utilizing the PSP 610. For instance, the PSP 610 represents a valid state of the display tree 608 that remains valid and usable by the render thread 606 until the render thread 606 releases the PSP 610, and/or moves on to processing a subsequent PSP. In at least some embodiments, after the render thread 606 is finished processing the PSP 610, a memory address and/or addresses for the PSP 610 can be released to be used for other purposes, e.g., a subsequent PSP.

Thus, visual processing applied by the primary thread 604 to the display tree 608 is propagated via the change data 612 to the render thread 606, which then applies the visual processing to its own display tree 614.

Further illustrated in the lower portion of the scenario 600 is that the primary thread 604 emits a PSP 616 which includes change data 618. The change data 618, for example, indicates changes to the state of the display tree 608 that have occurred subsequent to the primary thread 604 emitting the PSP 610.

When the render thread 606 is finished drawing to the GUI 602 from the current state of the display tree 614, the render thread 606 can retrieve the PSP 616 and can synchronize the display tree 614 based on the change data 618. The render thread 606 can then proceed with rendering the GUI 602 based on the updated display tree 614.

Thus, the scenario 600 illustrates that PSPs can be employed to share changes in a visual state of a GUI among threads without generating multiple copies of a display tree for the GUI. Further, the lifetime of a PSP can be managed to enable a particular state of a display tree to be persisted for a render thread, while a primary thread that generated the PSP performs other processing.

While the scenarios presented above are discussed with reference to rendering scenarios, this is not intended to be limiting. For example, synchronization points can be used to propagate state information between a variety of different threads as part of a variety of different processes and/or tasks.

In at least some embodiments, a GUI may include certain elements which cannot or must not be rendered separately on a different thread, e.g., for reasons of economy or correctness. Therefore, such embodiments can choose to process a PSP on a primary thread until they again deem it appropriate to use a render thread for improved performance. Further, such embodiments may choose to defer creation of a render thread, pause it, or shut it down depending on availability of resources.

Having discussed some example implementation scenarios, consider now a discussion of some example procedures in accordance with one or more embodiments.

Example Procedures

The following discussion describes some example procedures for synchronization points for state information in accordance with one or more embodiments. The example procedures may be employed in the environment 100 of FIG. 1, the system 1600 of FIG. 16, and/or any other suitable environment.

Figure 7:
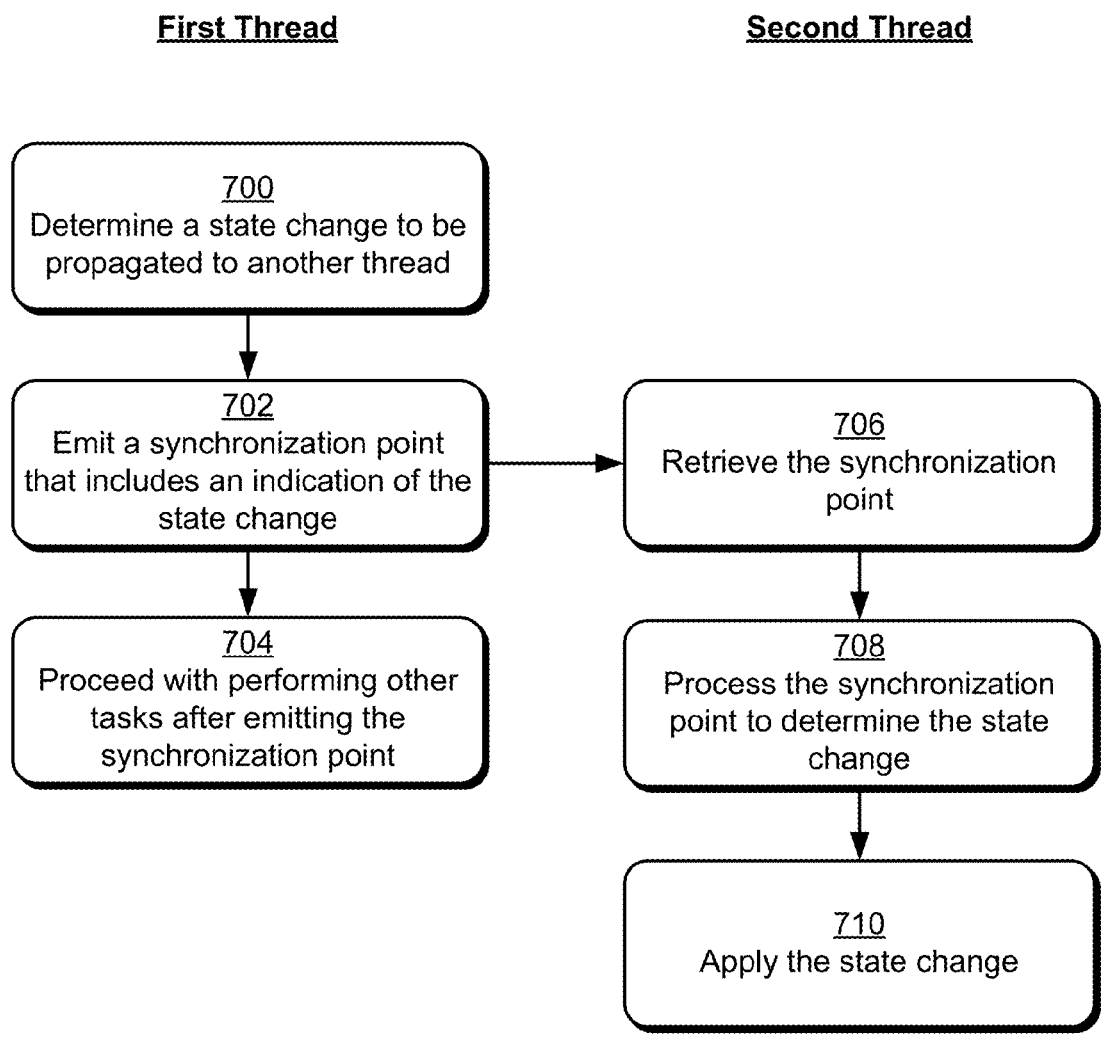
FIG. 7 is a flow diagram that describes steps in a method in accordance with one or more embodiments.

FIG. 7 is a flow diagram that describes steps in a method in accordance with one or more embodiments. The method is discussed with reference to steps associated with a first thread and steps associated with a second thread. The first thread and the second thread can be associated with a variety of different processes and/or tasks.

Step 700 determines a state change to be propagated to another thread. As discussed above, the state change can relate to a change in a visual aspect of a graphical element, such as a portion of the GUI. A variety of other types of state changes, however, can be propagated according to various embodiments. A state change, for example, can relate to a variety of different processes and/or resources associated with a computing device.

Step 702 emits a synchronization point that includes an indication of the state change. With reference to a change to visual aspect, for example, the synchronization point can include and/or identify data that indicates how the visual aspect is to be changed. For instance, the synchronization point can include one or more portions of the display tree for a graphical element that define how the graphical element is to be rendered and displayed. Alternatively and/or additionally, the synchronization point can identify where data for the state change can be found, such as a memory address.

In at least some embodiments, emitting a synchronization point can include placing the synchronization point in a synchronization point queue. For instance, if one or more other synchronization points remain to be processed, the synchronization point can be placed behind the other synchronization points in a synchronization point queue such that the different synchronization points can be processed in order.

Step 704 proceeds with performing other tasks after emitting the synchronization point. The first thread, for example, can continue executing other tasks, such as generating additional synchronization points. Thus, the first thread need not wait until the synchronization point is consumed by the second thread to continue processing.

Step 706 retrieves the synchronization point. The second thread, for example, can retrieve the synchronization point from a synchronization point queue.

Step 708 processes the synchronization point to determine the state change. The state change, for example, can relate to a change in a visual state of a graphical element, such as a GUI. As referenced above, however, embodiments are not limited to state changes in visual elements, and can refer to state changes in a variety of different processes, resources, and so on.

Step 710 applies the state change. The state change, for example, can be applied to a process and/or resource associated with the synchronization point. For instance, the state change can be applied to change the visual appearance of a graphical element.

Figure 8:
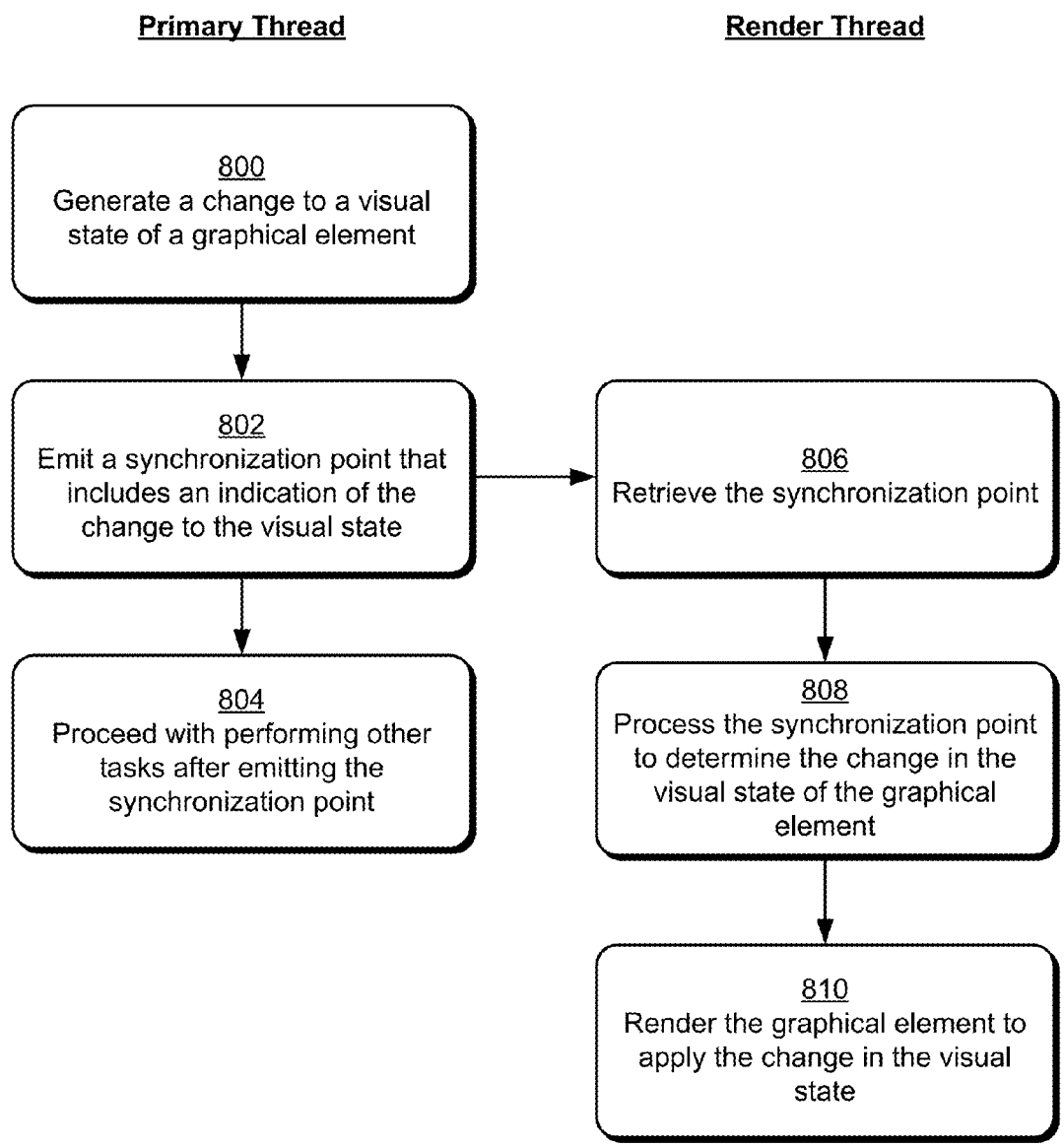
FIG. 8 is a flow diagram that describes steps in a method in accordance with one or more embodiments.

FIG. 8 is a flow diagram that describes steps in a method in accordance with one or more embodiments. The method is discussed with reference to steps associated with a primary thread, and steps associated with a render thread. Example embodiments and functionalities of a primary thread and a render thread are discussed above.

Step 800 generates a change to a visual state of a graphical element. For instance, the primary thread can perform various types processing that causes a change to a graphical element, such as a visual change to a GUI. As detailed above, the primary thread can make modifications to a display tree maintained by the primary thread.

Step 802 emits a synchronization point that includes an indication of the change to the visual state. The synchronization point, for example, can include data that characterizes the change, and/or can identify where the data may be retrieved. For instance, the synchronization point can include and/or identify a version of a display tree maintained by the primary thread.

Step 804 proceeds with performing other tasks after emitting the synchronization point. The primary thread, for example, need not wait for the render thread to consume the synchronization point before proceeding with other processing tasks.

Step 806 retrieves the synchronization point. The render thread, for instance, can retrieve the synchronization point from a synchronization point queue.

Step 808 processes the synchronization point to determine the change in the visual state of the graphical element. For instance, a display tree included with and/or identified by the synchronization point can be inspected.

Step 810 renders the graphical element to apply the change in the visual state. The render thread, for example, can apply the changes to the visual state to a display tree maintained by the render thread. The render thread can then render the graphical element based on the updated display tree.

While embodiments are discussed herein with reference to interaction between two different threads, this is presented for purpose of example only. For instance, in at least some embodiments multiple different threads can produce synchronization points and can emit the synchronization points for processing by a particular thread. In a GUI rendering scenario, for example, multiple different threads can produce synchronization points that specify changes to visual aspects of the GUI. The synchronization points can be emitted by the different threads for consumption by a rendering thread.

Having discussed some example implementation scenarios and procedures for synchronization points for state information, consider now some example implementation scenarios and procedures for coalescing graphics operations in accordance with one or more embodiments.

Coalescing Graphics Operations

The following section describes example implementation scenarios and procedures further to coalescing graphics operations in accordance with one or more embodiments. In at least some embodiments, the scenarios and procedures discussed below can employ aspects of the techniques discussed above.

Example Implementation Scenarios

The following discussion describes some example implementation scenarios for techniques for coalescing graphics operations described herein. The example implementation scenarios may be implemented in the environment 100 of FIG. 1, the system 1600 of FIG. 16, and/or any other suitable environment. The scenarios, for example, can represent functionality of the process manager module 110 and/or the graphics module 112. For instance, the processing threads discussed in the different scenarios can be generated and/or maintained by the process manager module 110 and/or the graphics module 112.

Figure 9:
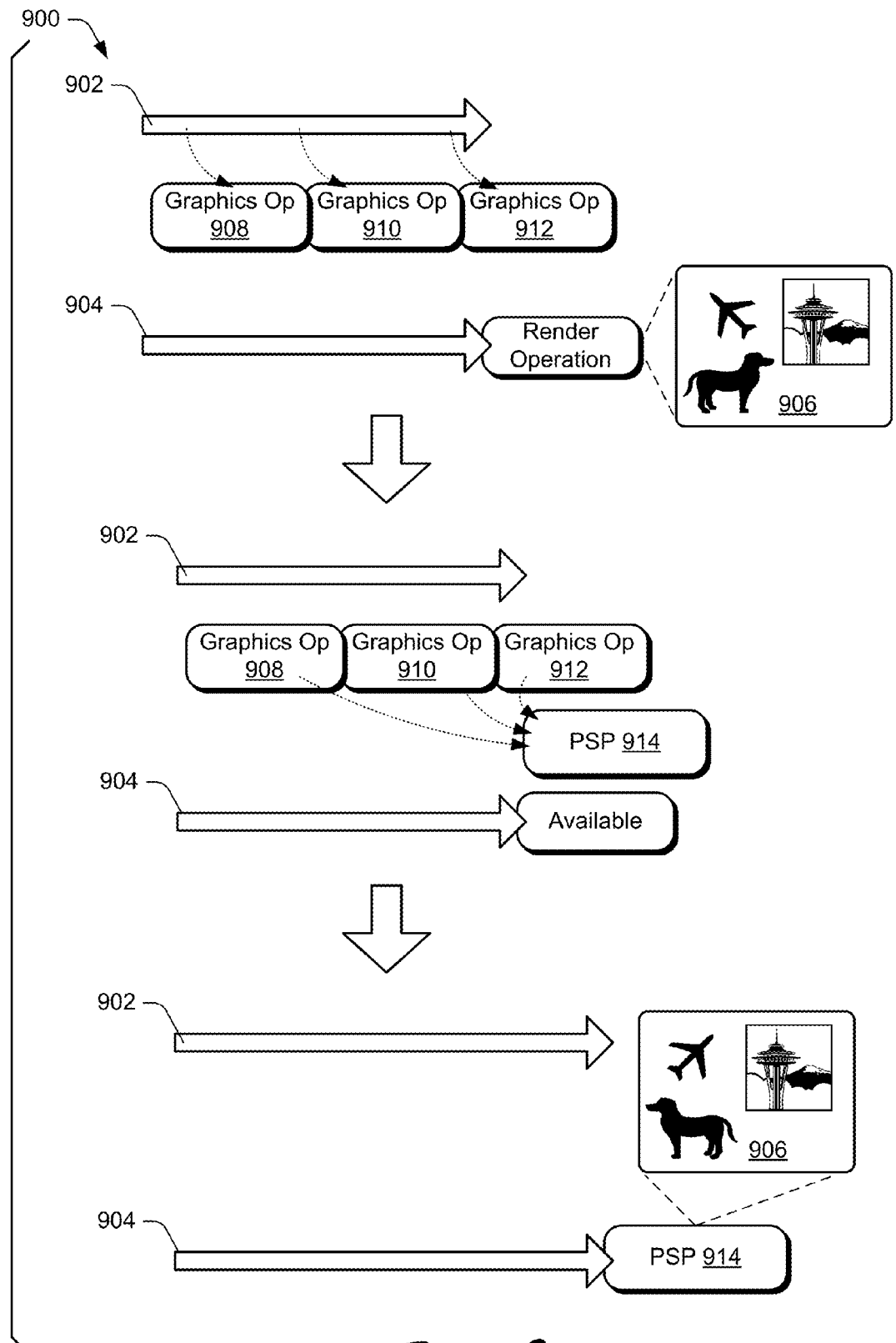
FIG. 9 illustrates an example implementation scenario in accordance with one or more embodiments.

FIG. 9 illustrates an example implementation scenario 900 in accordance with one or more embodiments. The scenario 900 includes a primary thread 902 and a render thread 904 for a GUI 906. Example implementations of a primary thread and a render thread are discussed above.

As further illustrated in the upper portion of the scenario 900, the render thread 904 is performing a render operation, such as based on a PSP emitted by the primary thread 902. While the render thread 904 is performing the render operation, the primary thread 902 is performing additional processing tasks, such as generating visual changes to be rendered to the GUI 906. For instance, the primary thread 902 generates a graphics operation 908, a graphics operation 910, and a graphics operation 912. Generally, the graphics operations 908, 910, 912 represent discrete visual changes to be applied to the GUI 906 that are generated via separate respective processing operations. The graphics operations 908, 910, 912 can each be associated with the same graphical element of the GUI 906, or with different respective graphical elements. In at least some embodiments, the graphics operations can each represent a PSP generated by the primary thread 902.

Proceeding to the center portion of the scenario 900, the render thread 904 completes the render operation, and thus is available to perform additional rendering tasks. In response, the graphics operations 908, 910, 912 are coalesced into a PSP 914. According to one or more embodiments, the PSP 914 represents a combination of the graphics operations 908, 910, 912 such that visual changes to the GUI 906 indicated in each of the graphics operations are represented in the PSP 914.

For instance, consider a scenario where the graphics operations 908, 910, 912 each affect the same graphical element of the GUI 906. The graphics operation 908 changes a color of the graphical element, and the graphics operations 910, 912 indicate respective translational movements of the graphical element within the GUI 906. Thus, the PSP 914 includes data for the color change, as well as the translational movements.

Proceeding to the lower portion of the scenario 900, the render thread 904 retrieves and processes the PSP 914. For instance, the render thread 904 renders to the GUI 906 based on graphics operations indicated in the PSP 914.

Thus, the scenario 900 illustrates that in one or more embodiments, when multiple graphics operations (e.g., PSPs) are accumulated (e.g., when a render thread is busy), the graphics operations can be coalesced into a combined graphics operation, such as via a PSP. The combined graphics operation can be rendered such that visual changes indicated in each individual operation are reflected in the displayed result. Accordingly, processing time and resources are conserved in that a render thread need not iterate through multiple individual operations, but can simply apply a single operation that reflects multiple combined operations.

Various techniques can be employed to track visual changes to graphical elements. For instance, a "patching" model can be utilized, which characterizes changes to visual elements as patches that can be applied prior to rendering. For instance, consider the following example scenarios.

Figure 10:
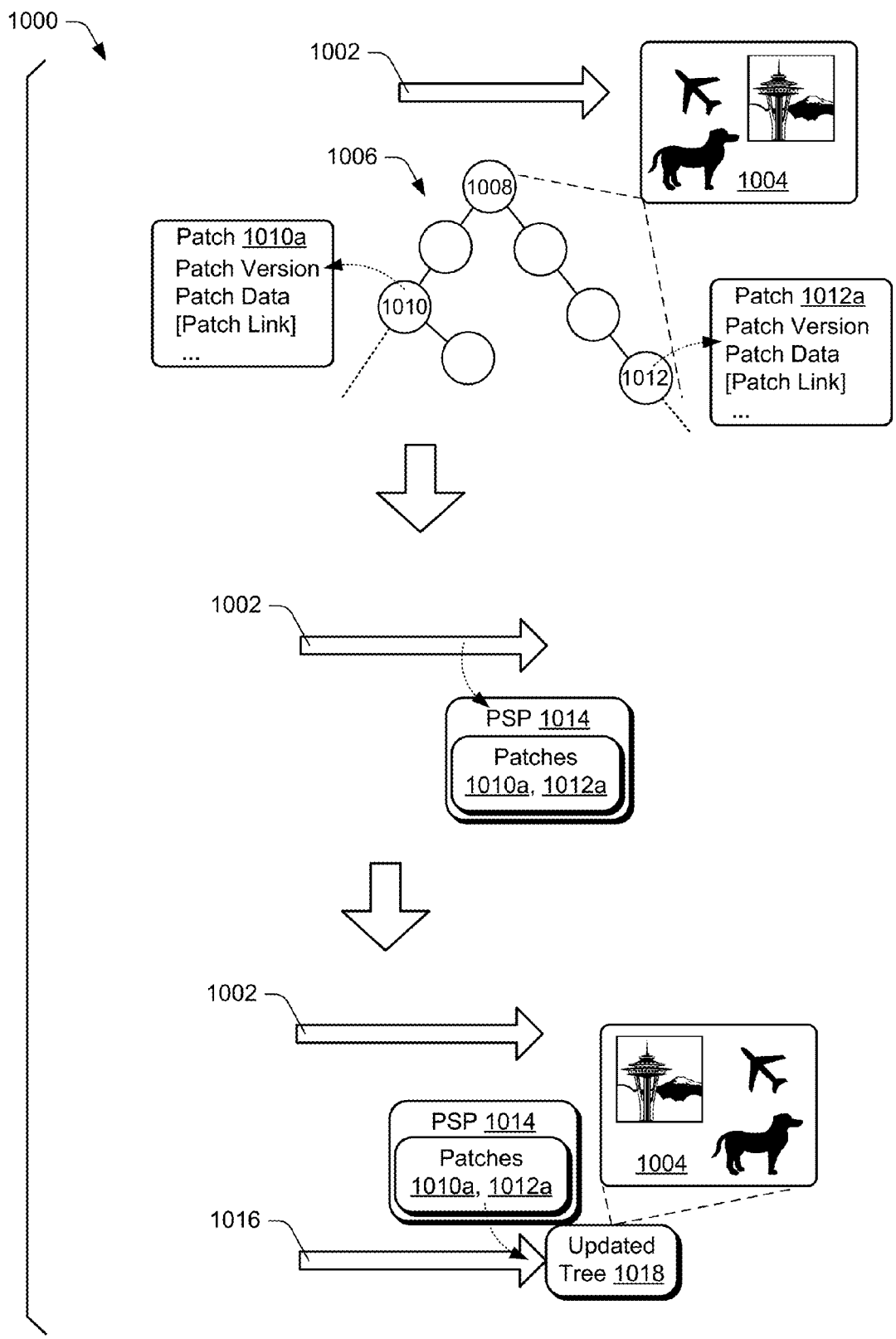
FIG. 10 illustrates an example implementation scenario in accordance with one or more embodiments.

FIG. 10 illustrates an example implementation scenario 1000 in accordance with one or more embodiments. The scenario 1000 includes a primary thread 1002, which is representative of one or more different types of processing threads that can be employed to perform various processing tasks for a GUI 1004. Example implementations of a primary thread are discussed above.

Associated with the primary thread 1002 is a display tree 1006, which is representative of a data structure for defining aspects of the GUI 1004. The display tree 1006, for example, includes multiple nodes that define various attributes of the GUI 1004. For instance, individual nodes of the display tree 1006 can include data that defines respective graphical elements of the GUI 1004, such as a window, a text element, an image element, a fillable field, a selectable control, and so forth.

For instance, the display tree 1006 includes a parent node 1008, a child node 1010, and a child node 1012. The parent node 1008, for example, can represent a primary window of the GUI 1004. The child nodes, 1010, 1012 represent graphical elements within the primary window.

According to one or more embodiments, the primary thread 1002 generates "patches" for the display tree 1006 to indicate changes to the GUI 1004. For instance, when an event occurs that changes a visual attribute of the GUI 1004, the primary thread 1002 generates a patch for a node of the display tree 1006 that corresponds to the changed visual attribute.

Consider, for example, that an event processed by the primary thread 1002 causes a change to graphical elements associated with the nodes 1010, 1012, respectively. Examples of an event include user input, animation, color changes, events generated by other processes, and so forth. In response to the event, the primary thread 1002 generates a patch 1010*a* for the node 1010, and a patch 1012*a* for the node 1012.

The node 1010 includes a link to the patch 1010*a* and a version number for the patch 1010*a*. The patch 1010*a* further includes a patch version, which indicates a version for the patch 1010*a*. For instance, multiple changes to the node 1010 can occur, with a patch being generated for each change. As each new patch is generated, a version number for each patch can be updated to indicate a relative position of each patch in a sequence of patches. As detailed below, this can enable changes to a node to be accurately rendered.

The patch 1010*a* also includes patch data, which indicates changes to the node 1010. The patch data, for example, can indicate changes such as movement of a graphical element, color changes, size changes, and so forth. A patch can include a variety of other types of data as well, in accordance with one or more embodiments.

Similar to the patch 1010*a*, the patch 1012*a* includes a node ID and a patch version.

According to various embodiments, the node 1010 includes a link (e.g. a pointer) to the patch 1010*a*, and the node 1012 includes a link to the patch 1012*a*. Thus, when a thread accesses a node, the presence of a link indicates that a patch exists for the node. A link can be followed to access an associated patch.

In at least some embodiments, a patch is cumulative in nature such that subsequent changes to a node cause an existing patch for the node to be updated. Accordingly, the primary thread 1002 can base further changes to the state of the node 1010 on the patch 1010*a*. As detailed below, for instance, the primary thread 1002 can generate an updated version of the patch 1010*a* to indicate further changes in a state of the node 1010.

Proceeding to the center portion of the scenario 1000, the visual changes indicated by the patches 1010*a*, 1012*a* are to be propagated to the GUI 1004. The primary thread 1002, for example, can determine that visual changes to the GUI 1004 are to be applied by a render thread. Accordingly, the primary thread 1002 emits a PSP 1014, which includes the patches 1010*a*, 1012*a*.

Continuing to the lower portion of the scenario 1000, a render thread 1016 retrieves and processes the PSP 1014. For instance, the render thread 1016 applies patch data from the patch 1010*a* to the node 1010, and patch data from the patch 1012*a* to the node 1012, to generate an updated display tree 1018. Thus, data of the nodes 1010, 1012 is updated based on the patches 1010*a*, 1012*a*, respectively. The render thread 1016 then reads from the updated display tree 1018 and renders to the GUI 1004 based on data from the updated display tree 1018.

With reference to the scenario 800 discussed previously, the individual graphics operations can be implemented as patches that can be coalesced into a single combined graphics operation, e.g., as single PSP.

As illustrated in the scenario 1000, various threads (e.g., the primary thread 1002 and the render thread 1016) can maintain logically consistent views of a display tree and operate based on their respective view of the display tree without interfering with each other. The primary thread 1002, for instance, creates patches as needed so that the render thread 1016 can read from a most recent version of the tree independent of any unapplied patches for the tree. Thus, the primary thread 1002 views the display tree in the context of any unapplied patches. As the render thread 1016 moves forward in processing time, it applies patches (e.g., from PSPs), after which the patches can be retired. Thus, the render thread 1016 views the display tree in its most recently updated form, e.g., not including any unapplied patches.

According to various embodiments, a node can be patched multiple times between render operations (e.g., between PSPs) to track changes in node state. For instance, consider the following example scenario.

Figure 11:
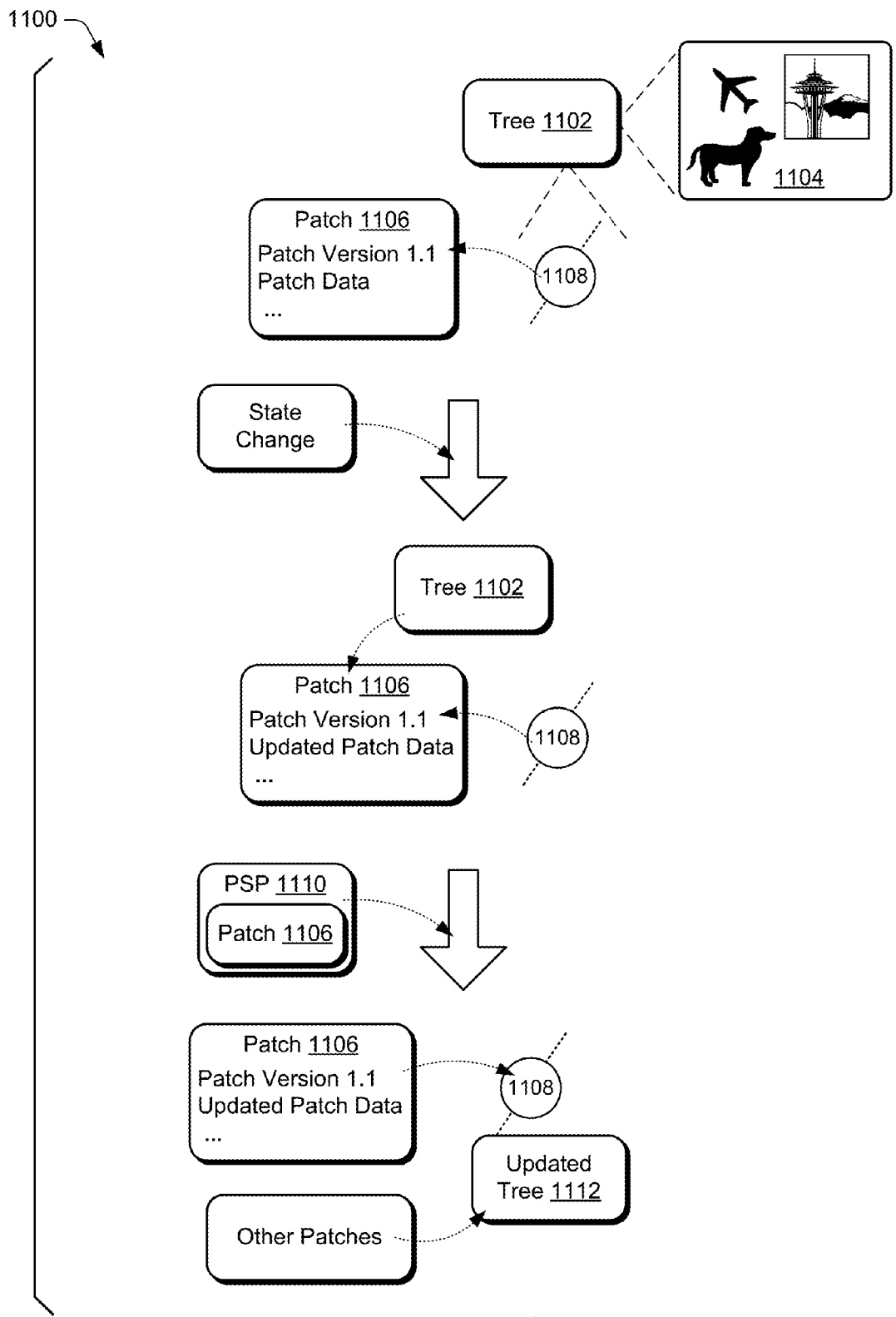
FIG. 11 illustrates an example implementation scenario in accordance with one or more embodiments.

FIG. 11 illustrates an example implementation scenario 1100 in accordance with one or more embodiments. The scenario 1100 represents an example technique for utilizing patches to track updates to node state for a display tree between rendering passes. The scenario 1100 includes a display tree 1102, which represents visual attributes of a GUI 1104.

Associated with the display tree 1102 is a patch 1106, which is generated based on a state change that is to be applied to a visual attribute of the GUI 1104. As illustrated, the patch 1106 applies to a node 1108 of the display tree 1102.

Proceeding to the center portion of the scenario 1100, an event (e.g., a processing event) indicates a further state change that is to be applied to the node 1108. Accordingly, patch data in the patch 1106 is updated to reflect the further state change. In at least some embodiments, the patch 1106 is cumulative, such that multiple changes in state information for the node 1108 are reflected in the patch data of the patch 1106.

Continuing to the lower portion of the scenario 1100, a PSP 1110 that includes the patch 1106 is generated that indicates that a render operation is to be performed to the GUI 1104. For instance, the PSP 1110 can be generated by a primary thread for the GUI 1104. A render thread for the GUI 1104 processes the PSP 1110 and applies the patch 1106 to the node 1108 to generate an updated display tree 1112.

Along with the patch 1106, other patches generated for other nodes of the display tree 1102 can be applied by the render thread to generate the updated display tree 1112. For instance, state information from the other patches is applied to the respective nodes.

In at least some embodiments, a list of nodes that have associated patches is maintained, e.g., as part of and/or separate from the PSP 1110. Thus, the list can be employed to generate the updated tree 1112 in an orderly fashion. As mentioned above, a node includes a link (e.g., a pointer) to any patches for the node. Thus, keeping a list of nodes for which patches have been generated provides for a more efficient use of resources since both a node to be patched and patches for the node can be located in a single operation.

Once the render thread is finished applying patches from the PSP 1110 to generate the updated display tree 1112, the render thread can read from the updated display tree 1112 and render to the GUI 1104.

According to various embodiments, different processing threads can utilize different versions of a display tree. For instance, consider the follow example implementation scenario.

Figure 12:
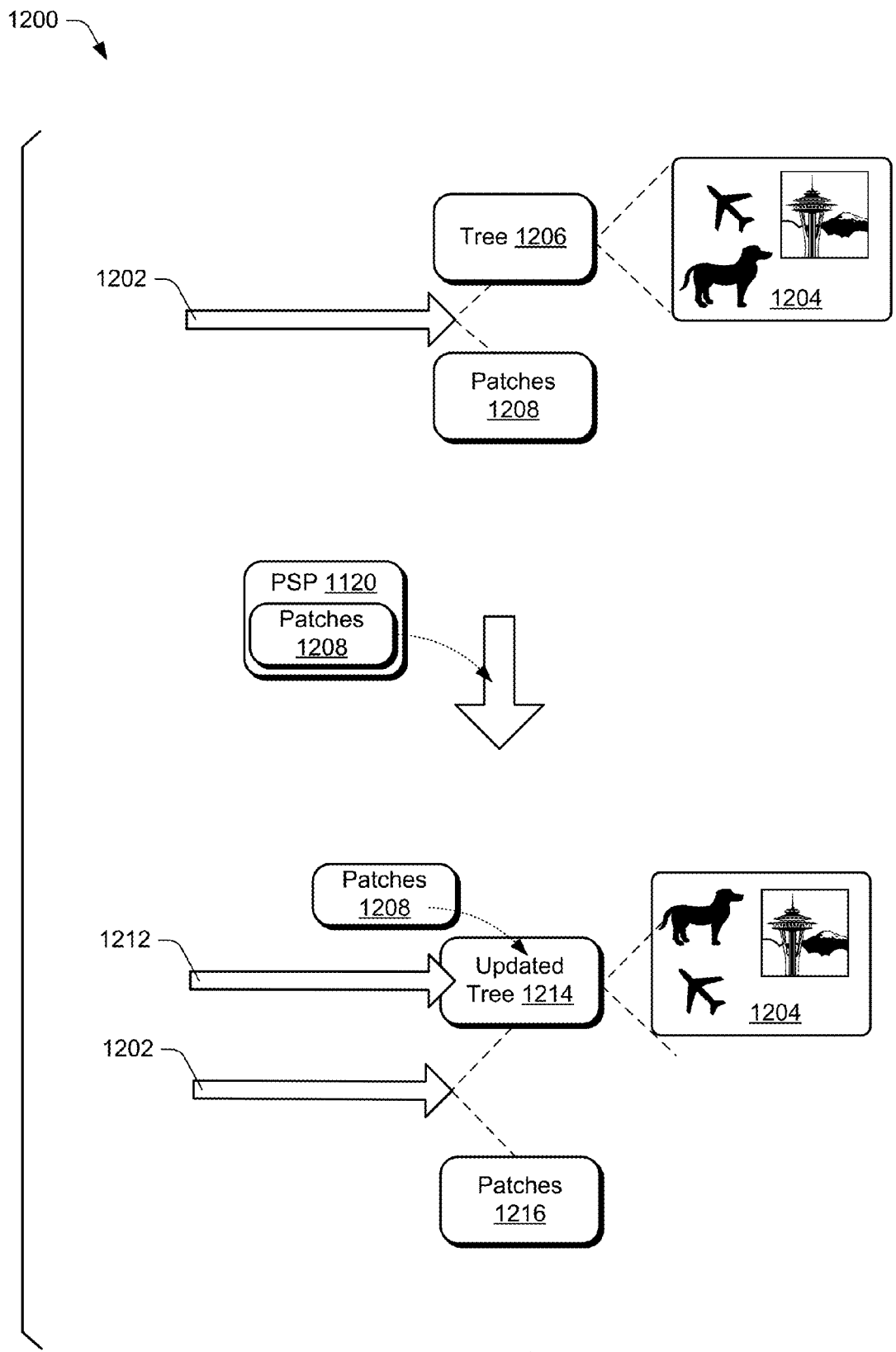
FIG. 12 illustrates an example implementation scenario in accordance with one or more embodiments.

FIG. 12 illustrates an example implementation scenario 1200 in accordance with one or more embodiments. The scenario 1200 includes a primary thread 1202, which performs various processing tasks for a GUI 1204. Further illustrated is a display tree 1206, which represents visual attributes of the GUI 1004. The display tree 1206 is associated with patches 1208, which include state information for nodes of the display tree 1206. As discussed above and below, the patches 1208 can be generated and/or updated by the primary thread 1202 between and/or during render operations to reflect ongoing changes to the visual state of the GUI 1204.

Proceeding to the lower portion of the scenario 1200, a PSP 1120 is emitted by the primary thread 1202 that includes the patches 1208. The PSP 1120 instructs a render thread 1212 to apply the patches 1208 and render to the GUI 1204. Thus, the render thread 1212 applies the patches 1208 to generate an updated display tree 1214. For instance, nodes of the display tree 1206 can be updated with state information from the patches 1208 to generate the updated display tree 1214.

The render thread 1212 then reads data from the updated display tree 1214, and renders to the GUI 1204 based on the data.

Also illustrated is that the primary thread 1202 continues perform processing for the GUI 1204 after the updated display tree 1214 is generated, and thus generates patches 1216 for the updated display tree 1214. According to various embodiments, the primary thread 1202 views and/or operates on the updated display tree 1214 in the context of the display tree itself, as well as the associated patches 1216. The render thread 1212, however, accesses only the updated display tree 1214 and not the patches 1216. Further, the primary thread 1202 can continue to perform processing (e.g., generating the patches 1216) after the updated display tree 1214 is generated and without waiting for the render thread 1212 to render based on the updated display tree 1214.

Thus, the primary thread 1202 generates and/or updates patches based on different events that affect the visual state of the GUI 1204. The render thread 1212 occasionally updates a display tree for the GUI 1204 with patches that have accumulated since a previous display tree update. The render thread 1212 renders from the most recent version of a display tree, such as the updated display tree 1214. Accordingly, patches can be used to track changes in visual state of the GUI 1204 between render operations, and can be applied to update a renderable state of a display tree for the GUI 1204.

Example Procedures

The following discussion describes some example procedures for coalescing graphics operations in accordance with one or more embodiments. The example procedures may be employed in the environment 100 of FIG. 1, the system 1600 of FIG. 16, and/or any other suitable environment.

Figure 13:
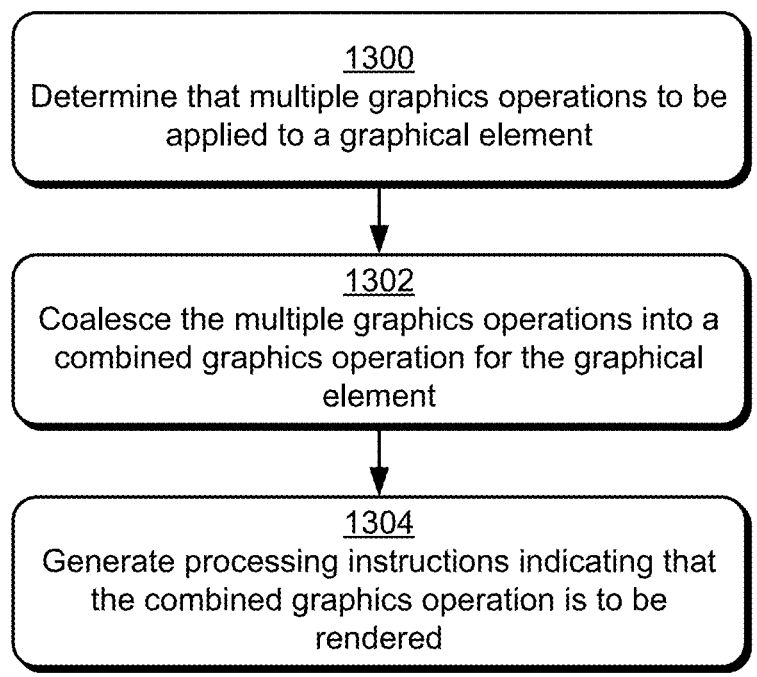
FIG. 13 is a flow diagram that describes steps in a method in accordance with one or more embodiments.

FIG. 13 is a flow diagram that describes steps in a method in accordance with one or more embodiments. Step 1300 determines that multiple graphics operations are to be applied to a graphical element. The graphics operations, for example, can correspond to multiple changes to a visual state of a graphical element, such as a GUI. For instance, the graphics operations can each represent a separate, distinct data processing operation. In at least some embodiments, the graphics operations can correspond to different patches, different PSPs, and so forth.

Step 1302 coalesces the multiple graphics operations into a combined graphics operation for the graphical element. The combined graphics operation, for example, can reflect changes to visual state of the graphical element from each of the multiple graphics operations. Thus, the combined graphics operation can represent a cumulative effect of each of the individual graphics operations. In at least some embodiments, the combined graphics operation can be applied via a single render operation, e.g., without separately applying each of the individual graphics operations. Coalescing graphics operations, for instance, can include combining multiple patches into a single patch that can be applied to a display tree to generate an updated display tree that reflects state information from each of the patches.

According to various embodiments, a render thread may be busy rendering previous graphics operations. Thus, multiple current graphics operations can be queued while waiting for the render thread to become available. For instance, patches can be generated and/or updated based on the graphics operations. The multiple graphics operations can be coalesced in response to determining that the render thread has become available to perform further rendering. A group of patches, for example, can be combined to generate a single patch that can be applied to update a display tree.

Step 1304 generates processing instructions indicating that the combined graphics operation is to be rendered. For example, a render thread for the graphical element can be instructed and/or notified that a combined patch is to be applied to update a node for a graphical element, and that the graphical element is to be rendered based on the updated node. In at least some embodiments, a PSP can be generated that includes or points to the combined graphics operation, e.g., to a patch and/or group of patches to be used to update a display tree.

In at least some embodiments, a render thread can apply patches for multiple pending PSPs to a display tree, and then render from the display tree based on the most recently applied PSP. This enables a final visual result of multiple PSPs to be realized without requiring multiple intermediate draw operations, thus conserving system resources.

Figure 14:
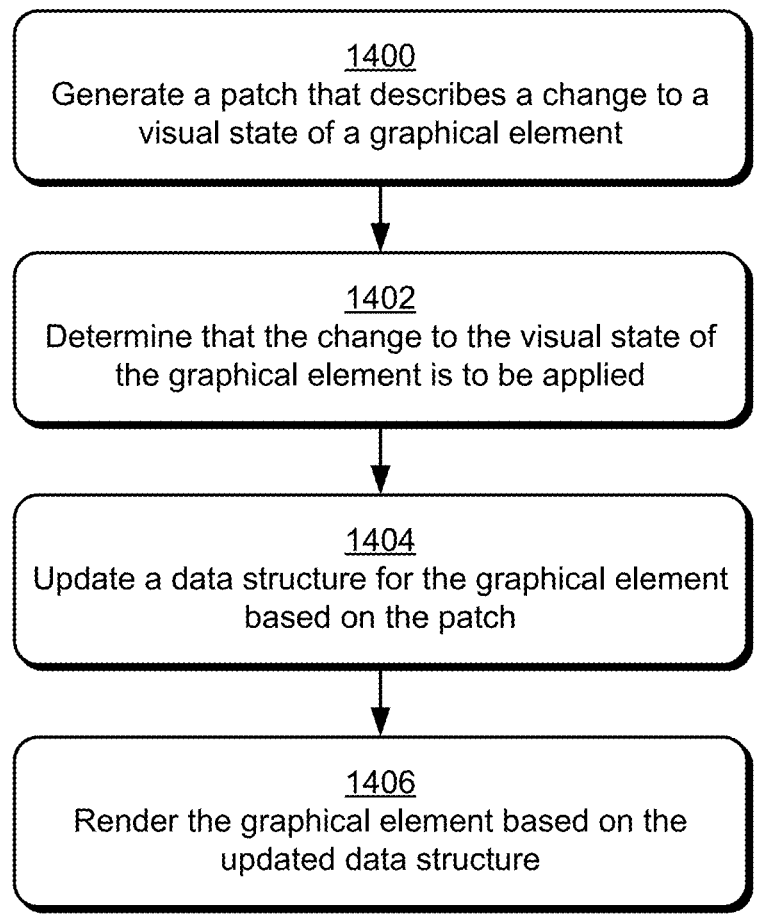
FIG. 14 is a flow diagram that describes steps in a method in accordance with one or more embodiments.

FIG. 14 is a flow diagram that describes steps in a method in accordance with one or more embodiments. In at least some embodiments, the method describes an example way of coalescing graphics operations for a graphical element.

Step 1400 generates a patch that describes a change to a visual state of a graphical element. The patch, for example, can be associated and/or linked to a node of a tree structure for a graphical element, such as a GUI. Thus, the patch can describe changes to be made to the node data. In various embodiments, the patch is separate from an associated node, and thus state information included in the patch does not affect a renderable state of the node until the patch is applied to the node.

Step 1402 determines that the change to the visual state of the graphical element is to be applied. For instance, an indication that a render thread is available to render the change can be received.

Step 1404 updates a data structure for the graphical element based on the patch. As discussed above, for instance, the patch can be applied to a node for the graphical element such that graphics data in the node is updated and/or replaced with graphics data from the patch. In at least some embodiments, multiple different patches can be applied to respective different nodes of a display tree to generate a renderable updated version of the display tree.

Step 1406 renders the graphical element based on the updated data structure. For example, a render thread can read from the updated data structure, and render the graphical element based on the updated data structure.

While embodiments are discussed herein with reference to updating an existing data structure (e.g., an existing node), it is to be appreciated that the techniques can be employed to generate a new data structure. A patch, for instance, can include instructions for generating a new node, a new sub-tree, and so forth. Thus, data structures can be created and updated via techniques discussed herein.

Figure 15:
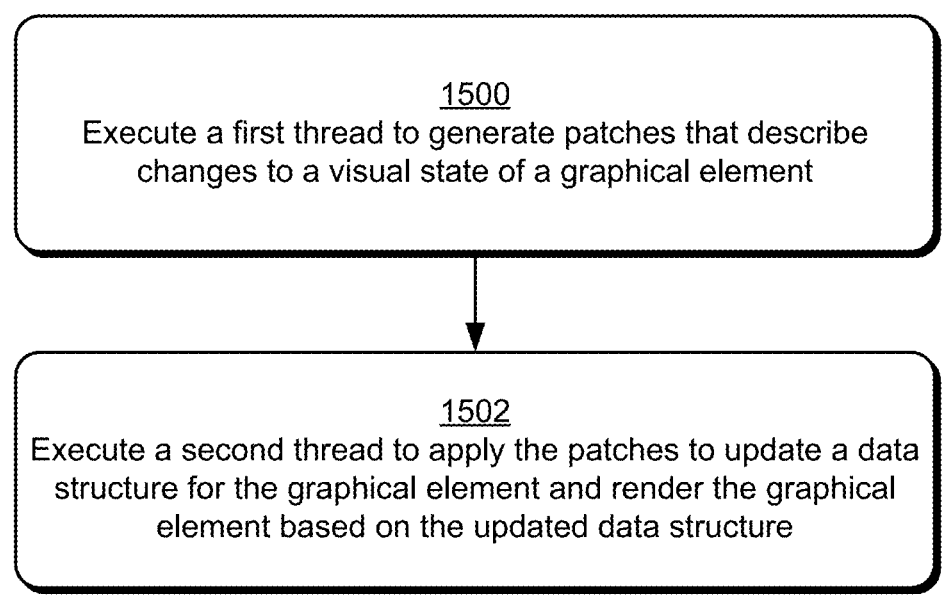
FIG. 15 is a flow diagram that describes steps in a method in accordance with one or more embodiments.

FIG. 15 is a flow diagram that describes steps in a method in accordance with one or more embodiments. In at least some embodiments, the method describes an example way of utilizing multiple threads for coalescing graphics operations.

Step 1500 executes a first thread to generate patches that describe changes to a visual state of a graphical element. As discussed above, for example, a primary thread for a GUI can generate and/or update patches for a display tree for a GUI.

Step 1502 executes a second thread to apply the patches to update a data structure for the graphical element and render the graphical element based on the updated data structure. For instance, as discussed above, a render thread for a GUI can apply the patches to a display tree to generate an updated display tree, and render one or more portions of the GUI based on the display tree.

According to various embodiments, the first thread and the second thread can be executed on different respective processor cores. Further, although a single thread is discussed as generating and applying patches to a data structure, it is to be appreciated that embodiments may employ multiple different threads to generate, update, and/or apply patches to a data structure. Additionally, embodiments may employ multiple rendering threads for rendering from a data structure, such as a display tree.

Having discussed some example procedures, consider now a discussion of an example system and device in accordance with one or more embodiments.

Example System and Device

Figure 16:
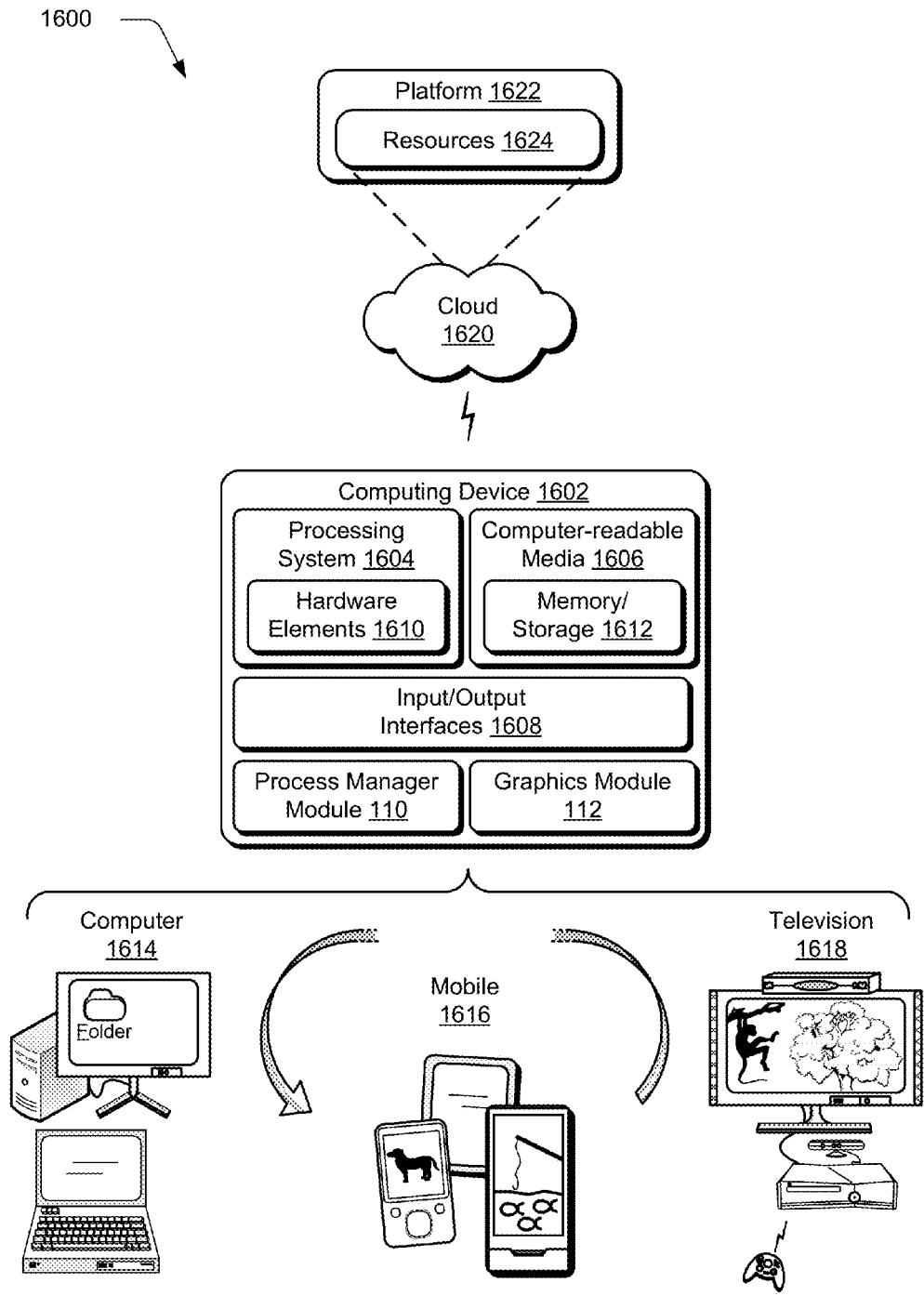
FIG. 16 illustrates an example system and computing device as described with reference to FIG. 1, which are configured to implement embodiments of techniques described herein.

FIG. 16 illustrates an example system generally at 1600 that includes an example computing device 1602 that is representative of one or more computing systems and/or devices that may implement various techniques described herein. For example, the computing device 102 discussed above with reference to FIG. 1 can be embodied as the computing device 1602. The computing device 1602 may be, for example, a server of a service provider, a device associated with the client (e.g., a client device), an on-chip system, and/or any other suitable computing device or computing system.

The example computing device 1602 as illustrated includes a processing system 1604, one or more computer-readable media 1606, and one or more Input/Output (I/O) Interfaces 1608 that are communicatively coupled, one to another. Although not shown, the computing device 1602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1604 is representative of functionality to perform one or more operations using hardware. Accordingly, the processing system 1604 is illustrated as including hardware element 1610 that may be configured as processors, functional blocks, and so forth. This may include implementation in hardware as an application specific integrated circuit or other logic device formed using one or more semiconductors. The hardware elements 1610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1606 is illustrated as including memory/storage 1612. The memory/storage 1612 represents memory/storage capacity associated with one or more computer-readable media. The memory/storage 1612 may include volatile media (such as random access memory (RAM)) and/or nonvolatile media (such as read only memory (ROM), Flash memory, optical disks, magnetic disks, and so forth). The memory/storage 1612 may include fixed media (e.g., RAM, ROM, a fixed hard drive, and so on) as well as removable media (e.g., Flash memory, a removable hard drive, an optical disc, and so forth). The computer-readable media 1606 may be configured in a variety of other ways as further described below.

Input/output interface(s) 1608 are representative of functionality to allow a user to enter commands and information to computing device 1602, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1602. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1610 and computer-readable media 1606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1610. The computing device 1602 may be configured to implement particular instructions and/or functions corresponding to the software and/or hardware modules. Accordingly, implementation of modules that are executable by the computing device 1602 as software may be achieved at least partially in hardware, e.g., through use of computer-readable storage media and/or hardware elements 1610 of the processing system. The instructions and/or functions may be executable/operable by one or more articles of manufacture (for example, one or more computing devices 1602 and/or processing systems 1604) to implement techniques, modules, and examples described herein.

As further illustrated in FIG. 16, the example system 1600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1602 may assume a variety of different configurations, such as for computer 1614, mobile 1616, and television 1618 uses. Each of these configurations includes devices that may have generally different constructs and capabilities, and thus the computing device 1602 may be configured according to one or more of the different device classes. For instance, the computing device 1602 may be implemented as the computer 1614 class of a device that includes a personal computer, desktop computer, a multi-screen computer, laptop computer, netbook, and so on.

The computing device 1602 may also be implemented as the mobile 1616 class of device that includes mobile devices, such as a mobile phone, portable music player, portable gaming device, a tablet computer, a multi-screen computer, and so on. The computing device 1602 may also be implemented as the television 1618 class of device that includes devices having or connected to generally larger screens in casual viewing environments. These devices include televisions, set-top boxes, gaming consoles, and so on.

The techniques described herein may be supported by these various configurations of the computing device 1602 and are not limited to the specific examples of the techniques described herein. For example, functionalities discussed with reference to the process manager module 110 and/or the graphics module 112 may be implemented all or in part through use of a distributed system, such as over a "cloud" 1620 via a platform 1622 as described below.

The cloud 1620 includes and/or is representative of a platform 1622 for resources 1624. The platform 1622 abstracts underlying functionality of hardware (e.g., servers) and software resources of the cloud 1620. The resources 1624 may include applications and/or data that can be utilized while computer processing is executed on servers that are remote from the computing device 1602. Resources 1624 can also include services provided over the Internet and/or through a subscriber network, such as a cellular or Wi-Fi network.

The platform 1622 may abstract resources and functions to connect the computing device 1602 with other computing devices. The platform 1622 may also serve to abstract scaling of resources to provide a corresponding level of scale to encountered demand for the resources 1624 that are implemented via the platform 1622. Accordingly, in an interconnected device embodiment, implementation of functionality described herein may be distributed throughout the system 1600. For example, the functionality may be implemented in part on the computing device 1602 as well as via the platform 1622 that abstracts the functionality of the cloud 1620.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Techniques for coalescing graphics operations are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
   at least one processor; and
   one or more computer-readable storage media including instructions stored thereon that, responsive to execution by the at least one processor, cause the system perform operations including:
   accumulating multiple graphics operations generated via multiple different processing operations in a first thread while a second thread for performing the multiple graphics operations is busy, the first thread executed on a first processor core and the second thread executed by a second processor core;
   determining that the multiple graphics operations are to be applied to a graphical element, the multiple graphics operations corresponding to multiple different visual changes to the graphical element;
   coalescing, in response to ascertaining that the second thread for performing the multiple graphics operations is available, the multiple graphics operations that were accumulated while the second thread for performing the multiple graphics operations was busy into a single combined graphics operation by generating a synchronization point for the combined graphics operation;
   emitting, by the first thread, the synchronization point for the combined graphics operation for execution by the second thread;
   executing, by the second thread, the single combined graphics operation via a single render operation to the graphical element without iterating through the individual multiple graphics operations, the single combined graphics operation reflecting the multiple graphics operations corresponding to the multiple different visual changes that accumulated while the second thread for performing the multiple graphics operations was busy.

2. A system as recited in claim 1, wherein the graphical element comprises a graphical user interface (GUI), and wherein said coalescing comprises applying data from the multiple graphics operations to a data structure for the GUI.

3. A system as recited in claim 1, wherein said coalescing comprises combining visual state information from each of the multiple graphics operations into a combined visual state for the graphical element.

4. A system as recited in claim 1, wherein the executing further includes rendering the combined graphics operation via the second thread.

5. A system as recited in claim 1, wherein the multiple graphics operations are based on user input to the graphical element.

6. A system as recited in claim 1, wherein the operations further include executing the first thread to perform further processing after said coalescing and without waiting for the second thread to process the combined graphics operation.

7. A system as recited in claim 1, wherein the multiple graphics operations are represented by a patch for a node of a display tree for the graphical element, and wherein said coalescing comprises applying the patch to the node.

8. One or more computer-readable storage media comprising instructions stored thereon that, responsive to execution by a computing device, cause the computing device to perform operations comprising:
   generating, via a primary thread, a patch that describes a change to a visual state of a graphical element, the graphical element displayed as a portion of a graphical user interface (GUI);
   determining that the change to the visual state of the graphical element is to be applied to the graphical element;
   responsive to determining that a thread for performing the change to the visual state is busy, updating the patch to reflect a subsequent change to the visual state of the graphical element prior to updating a data structure for the graphical element;
   responsive to determining that the thread for performing the change to the visual state is available;
      generating a synchronization point comprising the updated patch, the synchronization point indicating that the updated patch is to be applied to generate the updated data structure and that the graphical element is to be rendered based on the updated data structure;
      passing the synchronization point from the primary thread to the thread for performing the change to the visual state; and
      responsive to the synchronization point being passed from the primary thread to the thread for performing the change to the visual state, updating the data structure for the graphical element based on the updated patch; and
   rendering, by the thread for performing the change to the visual state, the changes to the visual state of the graphical element reflected in the updated patch and based on the updated data structure via a single render operation to the graphical element without iterating through the individual changes to the visual state of the graphical element and without re-rendering other portions of the GUI.

9. One or more computer-readable storage media as recited in claim 8, wherein the data structure comprises a display tree, the patch is generated for a node of the display tree, and said updating the data structure comprises updating the node based on state information from the patch.

10. One or more computer-readable storage media as recited in claim 9, wherein the primary thread and the thread for performing the change to the visual state each utilize different respective versions of the display tree.

11. One or more computer-readable storage media as recited in claim 8, wherein said updating the patch comprises combining state information for the change in the visual state and the subsequent change to the visual state.

12. One or more computer-readable storage media as recited in claim 8, wherein said generating the patch is performed while the thread for performing the change to the visual state is rendering the graphical element based on a previous version of the data structure.

13. One or more computer-readable storage media as recited in claim 8, wherein the operations further comprise generating one or more different patches for the updated data structure and without affecting the updated data structure during said rendering.

14. One or more computer-readable storage media as recited in claim 8, wherein the data structure comprises a display tree, the operations further comprising maintaining a list of nodes of the display tree that have associated patches as part of the synchronization point.

15. One or more computer-readable storage media as recited in claim 8, wherein the change to the visual state of the graphical element is in response to one or more of a user input to the graphical element, animation of the graphical element, or events generated by additional processes of the computing device.

16. A computer-implemented method, comprising:
  executing via a first processor core a first thread to:
    generate patches that describe changes to a visual state of a graphical element, the patches corresponding to different graphics operations which describe multiple visual changes to the graphical element; and
    coalesce, in response to ascertaining that a second thread is available, the patches into a single combined graphics operation which corresponds to changed visual attributes of the graphical element, the coalescing comprising:
      generating a synchronization point for the combined graphics operation, the synchronization point indicating that the patches are to be applied to update a data structure and that the graphical element is to be rendered based on the update to the data structure, the data structure comprising a display tree for the graphical element; and
      emitting, by the first thread, the synchronization point for processing by the second thread; and
  executing via a second processor core the second thread to apply the combined graphics operation, responsive to the synchronization point being emitted, to update the data structure for the graphical element by applying the combined graphics operation to one or more nodes of the display tree, and render the graphical element based on the updated data structure without iterating through the different graphics operations.

17. A method as described in claim 16, wherein the graphical element comprises a graphical user interface (GUI), and wherein said coalescing comprises applying data from the multiple graphics operations to the data structure corresponding to the GUI.

18. A method as described in claim 16, wherein a node of the display tree is patched multiple times between render operations.

19. A method as described in claim 16, wherein the patches include state information for nodes of the display tree.

20. A method as described in claim 16, wherein the first thread and the second thread each utilize different respective versions of the display tree.

* * * * *